US010550705B2

(12) United States Patent
Solanki et al.

(10) Patent No.: US 10,550,705 B2
(45) Date of Patent: Feb. 4, 2020

(54) TURBINE EXHAUST SEAL

(71) Applicant: Garrett Transportation I Inc., Torrance, CA (US)

(72) Inventors: Shankar Pandurangasa Solanki, Bangalore (IN); Pierre Barthelet, Thaon les Vosges (FR); Arnaud Gerard, Epinal (FR); Vincent Eumont, Vosges (FR); Nicolas Morand, Deyvillers (FR); Francis Abel, La Baffe (FR)

(73) Assignee: Garrett Transportation I Inc., Torrance, CA (US)

( * ) Notice: Subject to any disclaimer, the term of this patent is extended or adjusted under 35 U.S.C. 154(b) by 1152 days.

(21) Appl. No.: 14/566,541

(22) Filed: Dec. 10, 2014

(65) Prior Publication Data

US 2016/0169018 A1 Jun. 16, 2016

(51) Int. Cl.
*F01D 11/00* (2006.01)
*F01D 1/22* (2006.01)
*F01D 25/24* (2006.01)

(52) U.S. Cl.
CPC ............. *F01D 11/003* (2013.01); *F01D 1/22* (2013.01); *F01D 25/24* (2013.01)

(58) Field of Classification Search
CPC ...... F01D 11/003; F01D 11/005; F04D 29/12; F05D 2240/55; F05D 2260/231
See application file for complete search history.

(56) References Cited

U.S. PATENT DOCUMENTS

| 7,351,042 B2 | 4/2008 | Jinnai et al. |
| 2011/0182722 A1 | 7/2011 | Matsuyama |
| 2012/0263585 A1 | 10/2012 | Matsuyama |
| 2012/0264585 A1 | 10/2012 | Matsuyama |
| 2013/0302148 A1 | 11/2013 | Solanki et al. |

(Continued)

FOREIGN PATENT DOCUMENTS

| CN | 101779018 A | 7/2010 |
| CN | 202467942 U | 10/2012 |

(Continued)

OTHER PUBLICATIONS

EPO Application No. 15 197 880.6, Search and Report dated May 12, 2016 (8 pages).

(Continued)

*Primary Examiner* — Carlos A Rivera
*Assistant Examiner* — Cameron A Corday
(74) *Attorney, Agent, or Firm* — Brian J. Pangrle

(57) ABSTRACT

A turbine housing assembly seal can include a cylindrical portion that defines an opening having an axis where the cylindrical portion is disposed at a cylinder radius from the axis; a lower edge disposed at a lower edge radius that exceeds the cylinder radius; an sloped annular portion that extends radially inwardly from the lower edge; a lower bend that extends from the sloped annular portion to a lower axial position of the cylindrical portion; an upper bend that extends from an upper axial position of the cylindrical portion; and an upper edge that extends radially outwardly from the upper bend to an upper edge radius that exceeds the cylinder radius and that is less than the lower edge radius.

16 Claims, 15 Drawing Sheets

(56) References Cited

U.S. PATENT DOCUMENTS

2013/0302185 A1\* 11/2013 Gerard .................. F01D 11/00
 417/407
2014/0241858 A1 8/2014 Tashiro et al.
2015/0044037 A1 2/2015 Bucking et al.

FOREIGN PATENT DOCUMENTS

| EP | 1691034 A2 | 8/2006 |
| EP | 2180160 A1 | 4/2010 |
| EP | 2243939 A1 | 10/2010 |
| EP | 2662532 A2 | 11/2013 |
| EP | 2759687 A1 | 7/2014 |
| EP | 2770167 A1 | 8/2014 |
| JP | 2010112195 A | 5/2010 |
| WO | 2013148486 A1 | 10/2013 |

OTHER PUBLICATIONS

EPO Application No. 15 197 657.8, Search and Report dated Jun. 22, 2016 (7 pages).
EPO Application No. 15 197 880.6, Examination Report dated Sep. 25, 2018 (5 pages).
CN Application No. 201511036111.9, First Office Action dated Nov. 16, 2018 with Search Report (6 pages).
CN Application No. 201511036110.4, First Office Action dated Feb. 22, 2019 with Search Report (5 pages).
EPO Application No. 15 197 657.8, Examination Report dated Nov. 8, 2018 (4 pages).

\* cited by examiner

TURBINE EXHAUST SEAL

TECHNICAL FIELD

Subject matter disclosed herein relates generally to exhaust turbines for turbochargers for internal combustion engines.

BACKGROUND

An exhaust system of an internal combustion engine can include a turbine wheel set in a turbine housing to create backpressure. In such a system, as pressurized exhaust from the internal combustion engine passes through the turbine housing (e.g., en route to an atmospheric outlet), the turbine wheel harnesses energy as the exhaust expands.

Various parameters may characterize a turbine wheel or a turbine housing. For example, a parameter known as "A/R" (e.g., area divided by radius) describes a geometric characteristic of a turbine housing where a smaller NR may increase velocity of exhaust directed to a turbine wheel and provide for increased power of a turbocharger at lower engine speeds (e.g., resulting in a quicker boost rise from a compressor). However, a small A/R may also cause exhaust flow in a more tangential direction, which may reduce flow capacity of a turbine wheel and, correspondingly, tend to increase backpressure. An increase in backpressure can reduce an engine's ability to "breathe" effectively at high engine speeds, which may adversely affect peak engine power. Conversely, use of a larger A/R may lower exhaust velocity. For a turbocharger, lower exhaust velocity may delay boost rise from a compressor. For a larger NR turbine housing, flow may be directed toward a turbine wheel in a more radial fashion, which can increase effective flow capacity of the turbine wheel and, correspondingly, result in lower backpressure. A decrease in backpressure can allow for increased engine power at higher engine speeds.

As a turbine housing and turbine wheel can create backpressure in an exhaust system, opportunities exist for exhaust leakage. For example, during operation of a turbine, a turbine housing space can be at a higher pressure than its environment. Also, consider expansion of exhaust gas across a turbine wheel, where pressure downstream of the turbine wheel can be considerably lower than that of a turbine housing volute region. Hence, in such an example, two possible regions may exist for exhaust leakage.

For example, exhaust leakage may be of a type that leaks out of an exhaust system to the environment or of a type that remains within an exhaust system yet bypasses a turbine wheel space. As to the latter, such leakage may occur between components of an exhaust turbine, for example, where the components may expand, contract, experience force, etc., as operational conditions vary. Further, where cycling occurs (e.g., as in vehicles), components may wear, become misaligned, etc., as cycle number increases. Whether external or internal, leakage can alter performance of a turbine wheel and turbine housing assembly. For example, a leaky turbine housing may not perform according to its specified A/R performance, which can complicate engine control, control of a variable geometry mechanism, etc. Various technologies and techniques described herein are directed to seals and sealing that can reduce leakage of exhaust, for example, within a turbine assembly.

BRIEF DESCRIPTION OF THE DRAWINGS

A more complete understanding of the various methods, devices, assemblies, systems, arrangements, etc., described herein, and equivalents thereof, may be had by reference to the following detailed description when taken in conjunction with examples shown in the accompanying drawings where:

FIGS. 2A, 2B and 2C are a series of cross-sectional views of an example of a turbocharger assembly;

DETAILED DESCRIPTION

Figure 1:
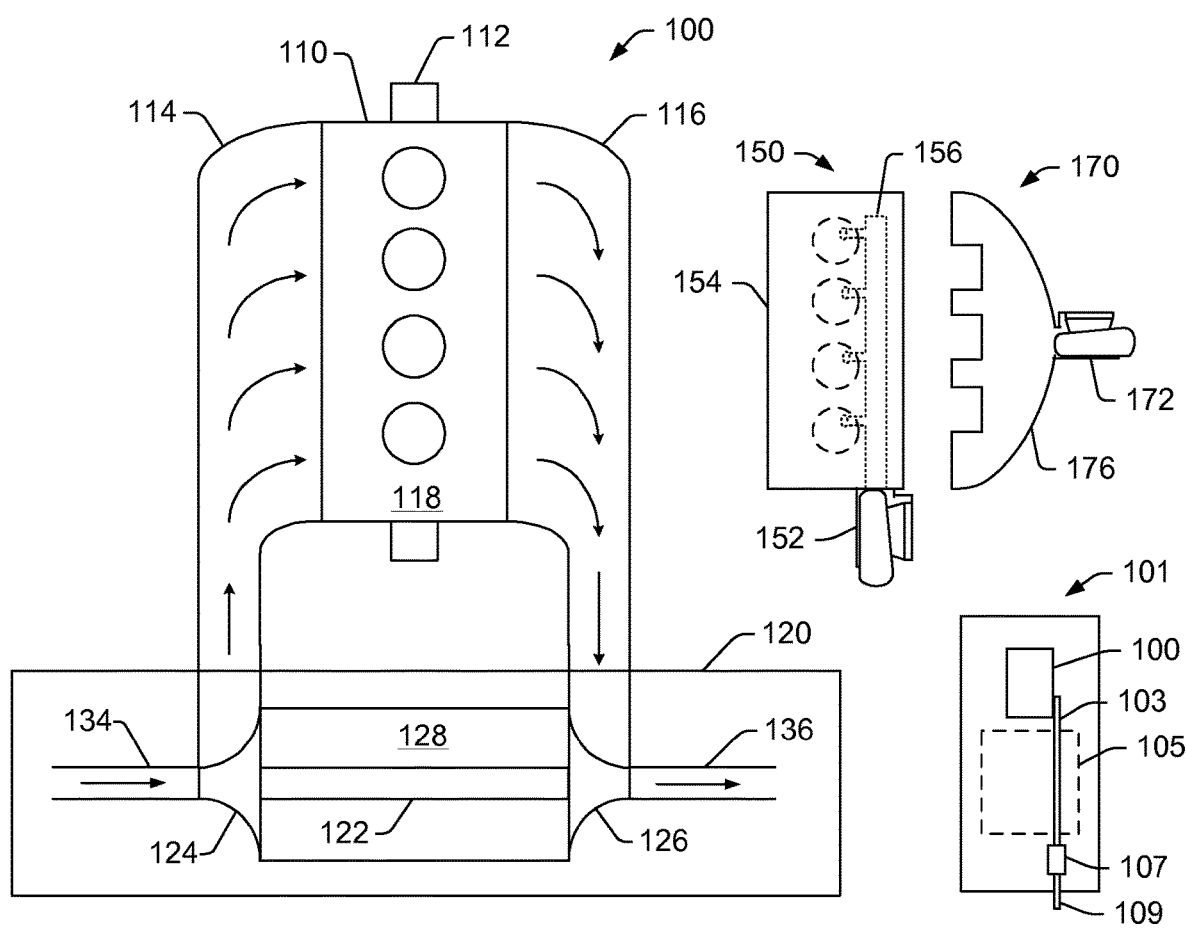
FIG. 1 is a diagram of a turbocharger and an internal combustion engine along with a controller.
Figure 1:
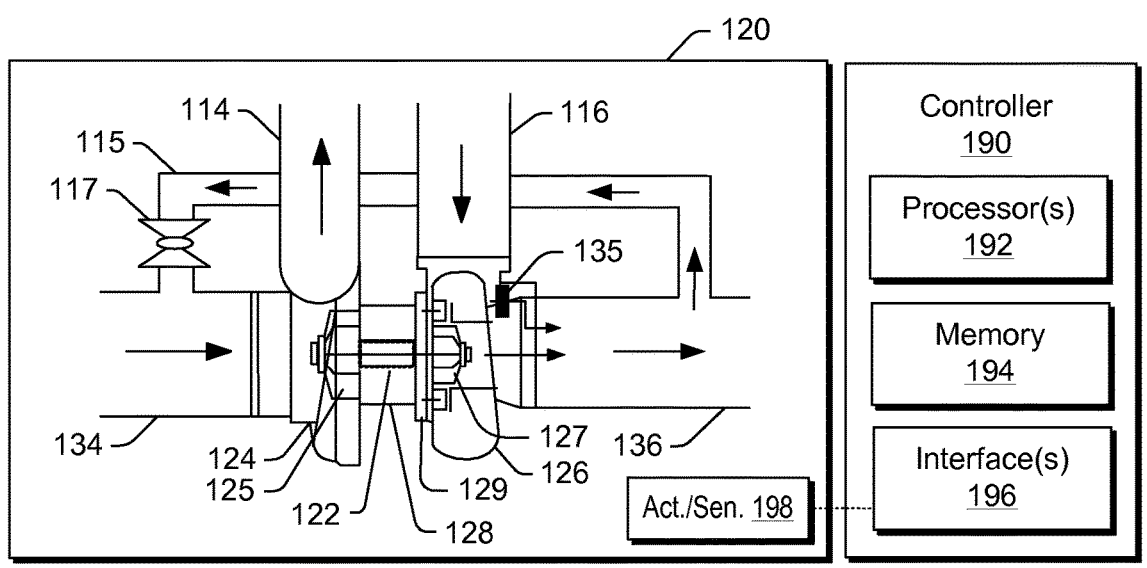

As described in various examples, exhaust leaks may occur in a turbine assembly. For example, exhaust may leak between two components of a turbine assembly such that the leaked exhaust bypasses a turbine wheel space. Where the leaked exhaust passes from a volute of a turbine assembly to an outlet of the turbine assembly, without passing through a turbine wheel space, the efficiency of the turbine assembly may decrease. Where components of a turbine assembly expand, contract, experience force, etc., exhaust leakage may vary and make turbine performance less predictable. Where a turbine wheel drives a compressor wheel to charge intake air for an internal combustion engine, variations in exhaust leakage can impact predictability of engine performance.

As an example, to mitigate exhaust leakage a turbine assembly may include a seal. For example, a turbine housing assembly seal can include a cylindrical portion that defines an opening having an axis where the cylindrical portion is disposed at a cylinder radius from the axis; a lower edge disposed at a lower edge radius that exceeds the cylinder radius; an sloped annular portion that extends radially inwardly from the lower edge; a lower bend that extends from the sloped annular portion to a lower axial position of the cylindrical portion; an upper bend that extends from an upper axial position of the cylindrical portion; and an upper edge that extends radially outwardly from the upper bend to an upper edge radius that exceeds the cylinder radius and that is less than the lower edge radius.

In the foregoing example, the seal may be deformable responsive to loading. Such deformability may allow the seal to seal a space between two components over a wide range of conditions. For example, a seal may deform responsive to force due to expansion or contraction of one or more components resulting from heating or cooling. As another example, a seal may deform responsive to axial thrust forces that occur during operation of an exhaust turbine (e.g., as in a turbocharger). As yet another example, a seal may deform in response to a load or loads applied to one or more components of a turbine assembly or a turbocharger assembly during an assembly process. In such an example, a bolt or other mechanism may be torqued according to a torque specification that results in a load (e.g., a "pre-load") being applied to a seal seated between two or more components of an assembly.

As an example, where a turbine assembly includes a shroud component, deformation of the shroud component may affect performance. For example, if a contoured shroud surface deforms, a clearance or clearances between blades of a turbine wheel and the inner shroud surface may change. As an example, such changes may impact fluid dynamics of exhaust, which may decrease performance, increase noise, vibration, etc. In an assembly, a shroud component may be subject to various forces. For example, a seal may contact a shroud component and contact a turbine housing such that force applied to the shroud component is transmitted to the turbine housing via the seal. Depending on the stiffness of the seal, such force may act to deform the shroud component. The type of deformation, risk of deformation, etc. may depend on where such a shroud component is supported with respect to where it contacts such a seal. For example, where distances between locations of mounts (e.g., spacers) that support a shroud component and contact locations of a seal with the shroud component increase, a risk of deformation may increase. As an example, a seal may be configured and located in an assembly to achieve distances between locations of mounts that support a shroud component and contact locations of the seal with the shroud component that act to reduce risk of deformation of the shroud component. For example, a seal may be configured with upper and lower portions that contact a turbine housing and a shroud component respectively where the lower portion is radially closer to a spacer that supports the shroud component (e.g., to more effectively transmit axial forces to a mount at that location). As an example, a seal may include a lower edge that is located axially closer to a mount location for a shroud component than an upper edge (e.g., the lower edge may be disposed at a radius greater than that of the upper edge).

As a particular example, a seal may be positioned between a cartridge and a turbine housing of a variable geometry turbine assembly (e.g., consider a VGT assembly or a variable nozzle turbine "VNT" assembly). In such an example, the cartridge may include a shroud component and an annular component spaced axially by mounts (e.g., spacers) where vanes are accommodated to control exhaust flow from a volute to a turbine wheel space. As an example, a vane may include a trailing edge and a leading edge with a pressure side airfoil and a suction side airfoil that meet at the trailing edge and the leading edge. Such a vane may have a planar upper surface and a planar lower surface where a clearance exists at least between the planar upper surface and the shroud component (e.g., between a lower planar surface of an annular portion of the shroud component). As an example, each vane may include an axis about which the vane may pivot (e.g., a pivot axis). As an example, each vane may include a post (e.g., or axle) that defines a pivot axis. In such an example, movement of a vane (e.g., arcwise) may be less closer to the pivot axis and greater further away from the pivot axis. For example, a trailing edge or a leading edge may be disposed a distance from the pivot axis such that upon pivoting of a vane, the leading edge and/or the trailing edge sweeps a maximum arc of the vane for a desired amount of pivoting. If clearance between an upper surface of a vane and a shroud component is diminished, the vane may bind, where the risk may increase depending on arc length as interaction area can increase with respect to arc length. In such an example, deformation to a shroud component may cause a vane or vanes to bind upon pivoting or even in a static position. Binding can result in loss of control, stress to a control mechanism, wear, etc.

As an example, a seal may be positioned in an assembly to reduce risk of deformation to a component such as a shroud component such that the seal can thereby reduce risk of vane sticking, binding, friction, etc. For example, where a shroud component is supported by mounts (e.g., spacers), a seal may contact the shroud component proximate to locations of such mounts on the shroud component. As an example, mount locations may be radially outward from a turbine wheel space (e.g., a shroud contour) as the mounts may interfere with exhaust flow, vane pivoting, etc. For example, as vanes may be shaped to provide a particular flow profile, locating mounts upstream (e.g., upstream of leading edges of the vanes) may have a lesser impact on flow to a turbine wheel space compared to locating mounts downstream (e.g., downstream of trailing edges of the vanes). In such an example, the shroud component may be supported near an outer radius (e.g., outer diameter), which may allow for flexing, deformation, etc. of portions interior thereto. Given such examples of constraints, a seal may be configured to contact a shroud component close to mount locations. Alternatively or additionally, a seal may be configured to contact a shroud component close to vane pivot axes such that force is transferred to a portion of a shroud component where vanes sweep smaller arcs.

While various examples of factors, constraints, etc. are described with respect to vane pivoting, shroud deformation, etc., a seal may likewise be constrained by factors as to sealing. As an example, a seal may be configured for sealing as well as reducing risk of shroud deformation, for example, by including lower contact points that may be positioned radially outwardly on a shroud component.

As an example, a seal may provide for a better stack up of components, for example, to reduce a turbine/cartridge differential expansion ratio leading to less compression/decompression of the seal. As an example, to locate a seal radially outwardly (e.g., closer to a mount, vane pivot axis, etc.), a seal may include an outer diameter that is a large percentage of a mount location diameter for a shroud component (e.g., approximately 75 percent or more). In such an example, contact area may also be increased (e.g., larger diameter), which may provide for a flexible seal configuration (e.g., seal shape). As mentioned, as an example, a seal may be elongated in part for contact radially outwardly on a shroud component and lesser so on a turbine housing. As an example, a seal may provide for better localization of loading transmission (e.g., closer to spacers, mounts, etc.), for example, which for a given load may decrease the potential deformation of a shroud component (e.g., conical or other form of deformation). As an example, a seal may be configured and positioned to reduce bending force on a shroud component, a spacer, etc., for example, to help avoid flexure of the shroud component and, for example, binding of vanes.

As an example, a seal may act to maintain performance predictability of a turbine or turbocharger by withstanding bulk temperatures of approximately 800 degrees C. and pressure differentials ($\Delta P_{max}$) of approximately 300 kPa. Such a seal may result in lower leak rates than a piston ring approach, which may have a leak rate of approximately 15 to approximately 30 l/min under a pressure differential of approximately 50 kPa. As an example, a seal may provide for lower stack-up limits (e.g., axial stack-up of components) and may comply with thermal evolution/growth during operation (e.g., and temperature cycling).

As to pressure differentials and temperatures in a variable geometry turbine assembly, as an example, exhaust in a volute may have pressure in a range of approximately 120 kPa to approximately 400 kPa and possible peak pressure of up to approximately 650 kPa (absolute) and temperature in a range of approximately 200 degrees C. to approximately 830 degrees C. and possible peak temperature of up to approximately 840 degrees C.; whereas, at a location axially downstream of a turbine wheel, exhaust may have pressure in a range of approximately 100 kPa to approximately 230 kPa (absolute) and temperature in a range of approximately 100 degrees C. to approximately 600 degrees C. As described herein, as an example, a seal may be made of a material and be configured to withstand pressures and temperatures in such ranges. For example, a seal may be made of a material such as the INCONEL® 718 alloy (Specialty Materials Corporation, New Hartford, N.Y.). The INCONEL® 718 alloy includes nickel (e.g., 50-55% by mass), chromium (e.g., 17-21% by mass), iron, molybdenum, niobium, cobalt, aluminum and other elements. Some other examples of materials include INCONEL® 625, C263 (aluminum-titanium age hardening nickel), René 41 (nickel-based alloy), WASPALOY® alloy (age hardened austenitic nickel-based alloy, United Technologies Corporation, Hartford, Conn.), etc. As an example, a seal may be shaped via a stamping process, a rolling process, etc.

As an example, a seal may be configured for ease of assembly, optionally without any specialized jigs, tools, etc. As an example, upon assembly (e.g., at ambient or room temperature), a seal may be positioned between two or more components and loaded to exert a particular force on a cartridge (e.g., X N) in a first axial direction where another load may be applied to the cartridge (e.g., Y N) by another component in a second, opposing axial direction, for example, to help maintain axial location of the cartridge. In such an example, the load Y applied to the cartridge by the component exceeds the load X applied to the cartridge by the seal (e.g., |Y|>|X|). In such an example, the resulting load on the cartridge (e.g., at ambient or room temperature) may be determined as |Y| minus |X|, in the direction of Y. The resulting load on the cartridge may help maintain its axial location in a turbine assembly (e.g., or in a turbocharger assembly). During operation, for example, where temperature and exhaust pressure are acting simultaneously, the load exerted by the seal may diminish and, in turn, the resulting load experienced by the cartridge may increase.

As an example, a seal may undergo a negligible level of plastic strain during operation (e.g., at an exhaust temperature of approximately 800 degrees C.). As to a duty cycle of a turbocharger, temperature may vary from approximately 200 degrees C. to approximately 800 degrees C. where load may vary correspondingly. As an example, a seal may offer near linear stiffness during thermal cycling (e.g., for an expected duty cycle).

Below, an example of a turbocharged engine system is described followed by various examples of components, assemblies, methods, etc.

Turbochargers are frequently utilized to increase output of an internal combustion engine. Referring to FIG. 1, as an example, a system 100 can include an internal combustion engine 110 and a turbocharger 120. As shown in FIG. 1, the system 100 may be part of a vehicle 101 where the system 100 is disposed in an engine compartment and connected to an exhaust conduit 103 that directs exhaust to an exhaust outlet 109, for example, located behind a passenger compartment 105. In the example of FIG. 1, a treatment unit 107 may be provided to treat exhaust (e.g., to reduce emissions via catalytic conversion of molecules, etc.).

As shown in FIG. 1, the internal combustion engine 110 includes an engine block 118 housing one or more combustion chambers that operatively drive a shaft 112 (e.g., via pistons) as well as an intake port 114 that provides a flow path for air to the engine block 118 and an exhaust port 116 that provides a flow path for exhaust from the engine block 118.

The turbocharger 120 can act to extract energy from the exhaust and to provide energy to intake air, which may be combined with fuel to form combustion gas. As shown in FIG. 1, the turbocharger 120 includes an air inlet 134, a shaft 122, a compressor housing assembly 124 for a compressor wheel 125, a turbine housing assembly 126 for a turbine wheel 127, another housing assembly 128 and an exhaust outlet 136. The housing assembly 128 may be referred to as a center housing assembly as it is disposed between the compressor housing assembly 124 and the turbine housing assembly 126.

In FIG. 1, the shaft 122 may be a shaft assembly that includes a variety of components (e.g., consider a shaft and wheel assembly (SWA) where the turbine wheel 127 is welded to the shaft 122, etc.). As an example, the shaft 122 may be rotatably supported by a bearing system (e.g., journal bearing(s), rolling element bearing(s), etc.) disposed in the housing assembly 128 (e.g., in a bore defined by one or more bore walls) such that rotation of the turbine wheel 127 causes rotation of the compressor wheel 125 (e.g., as rotatably coupled by the shaft 122). As an example a center housing rotating assembly (CHRA) can include the compressor wheel 125, the turbine wheel 127, the shaft 122, the housing assembly 128 and various other components (e.g., a compressor side plate disposed at an axial location between the compressor wheel 125 and the housing assembly 128).

In the example of FIG. 1, a variable geometry assembly 129 is shown as being, in part, disposed between the housing assembly 128 and the housing assembly 126. Such a variable geometry assembly may include vanes or other components to vary geometry of passages that lead to a turbine wheel space in the turbine housing assembly 126. As an example, a variable geometry compressor assembly may be provided.

In the example of FIG. 1, a wastegate valve (or simply wastegate) 135 is positioned proximate to an exhaust inlet of the turbine housing assembly 126. The wastegate valve 135 can be controlled to allow at least some exhaust from the exhaust port 116 to bypass the turbine wheel 127. Various wastegates, wastegate components, etc., may be applied to a conventional fixed nozzle turbine, a fixed-vaned nozzle turbine, a variable nozzle turbine, a twin scroll turbocharger, etc. As an example, a wastegate may be an internal wastegate (e.g., at least partially internal to a turbine housing). As an example, a wastegate may be an external wastegate (e.g., operatively coupled to a conduit in fluid communication with a turbine housing).

In the example of FIG. 1, an exhaust gas recirculation (EGR) conduit 115 is also shown, which may be provided, optionally with one or more valves 117, for example, to allow exhaust to flow to a position upstream the compressor wheel 125.

FIG. 1 also shows an example arrangement 150 for flow of exhaust to an exhaust turbine housing assembly 152 and another example arrangement 170 for flow of exhaust to an exhaust turbine housing assembly 172. In the arrangement 150, a cylinder head 154 includes passages 156 within to direct exhaust from cylinders to the turbine housing assembly 152 while in the arrangement 170, a manifold 176 provides for mounting of the turbine housing assembly 172, for example, without any separate, intermediate length of exhaust piping. In the example arrangements 150 and 170, the turbine housing assemblies 152 and 172 may be configured for use with a wastegate, variable geometry assembly, etc.

In FIG. 1, an example of a controller 190 is shown as including one or more processors 192, memory 194 and one or more interfaces 196. Such a controller may include circuitry such as circuitry of an engine control unit (ECU). As described herein, various methods or techniques may optionally be implemented in conjunction with a controller, for example, through control logic. Control logic may depend on one or more engine operating conditions (e.g., turbo rpm, engine rpm, temperature, load, lubricant, cooling, etc.). For example, sensors may transmit information to the controller 190 via the one or more interfaces 196. Control logic may rely on such information and, in turn, the controller 190 may output control signals to control engine operation. The controller 190 may be configured to control lubricant flow, temperature, a variable geometry assembly (e.g., variable geometry compressor or turbine), a wastegate (e.g., via an actuator), an electric motor, or one or more other components associated with an engine, a turbocharger (or turbochargers), etc. As an example, the turbocharger 120 may include one or more actuators and/or one or more sensors 198 that may be, for example, coupled to an interface or interfaces 196 of the controller 190. As an example, the wastegate 135 may be controlled by a controller that includes an actuator responsive to an electrical signal, a pressure signal, etc. As an example, an actuator for a wastegate may be a mechanical actuator, for example, that may operate without a need for electrical power (e.g., consider a mechanical actuator configured to respond to a pressure signal supplied via a conduit).

FIG. 2A shows an example of a turbocharger assembly 200 that includes a shaft 220 supported by a bearing 230 (e.g., a journal bearing, a bearing assembly such as a rolling element bearing with an outer race, etc.) disposed in a bore (e.g., a through bore defined by one or more bore walls) of a housing 280 between a compressor assembly 240 and a turbine assembly 260. The compressor assembly 240 includes a compressor housing 242 that defines a volute 246 and that houses a compressor wheel 244. As shown in FIG. 2A, the turbine assembly 260 includes a turbine housing 262 that defines a volute 266 and that houses a turbine wheel 264. The turbine wheel 264 may be, for example, welded or otherwise attached to the shaft 220 to form a shaft and wheel assembly (SWA) where a free end of the shaft 220 allows for attachment of the compressor wheel 244.

Figure 2C:
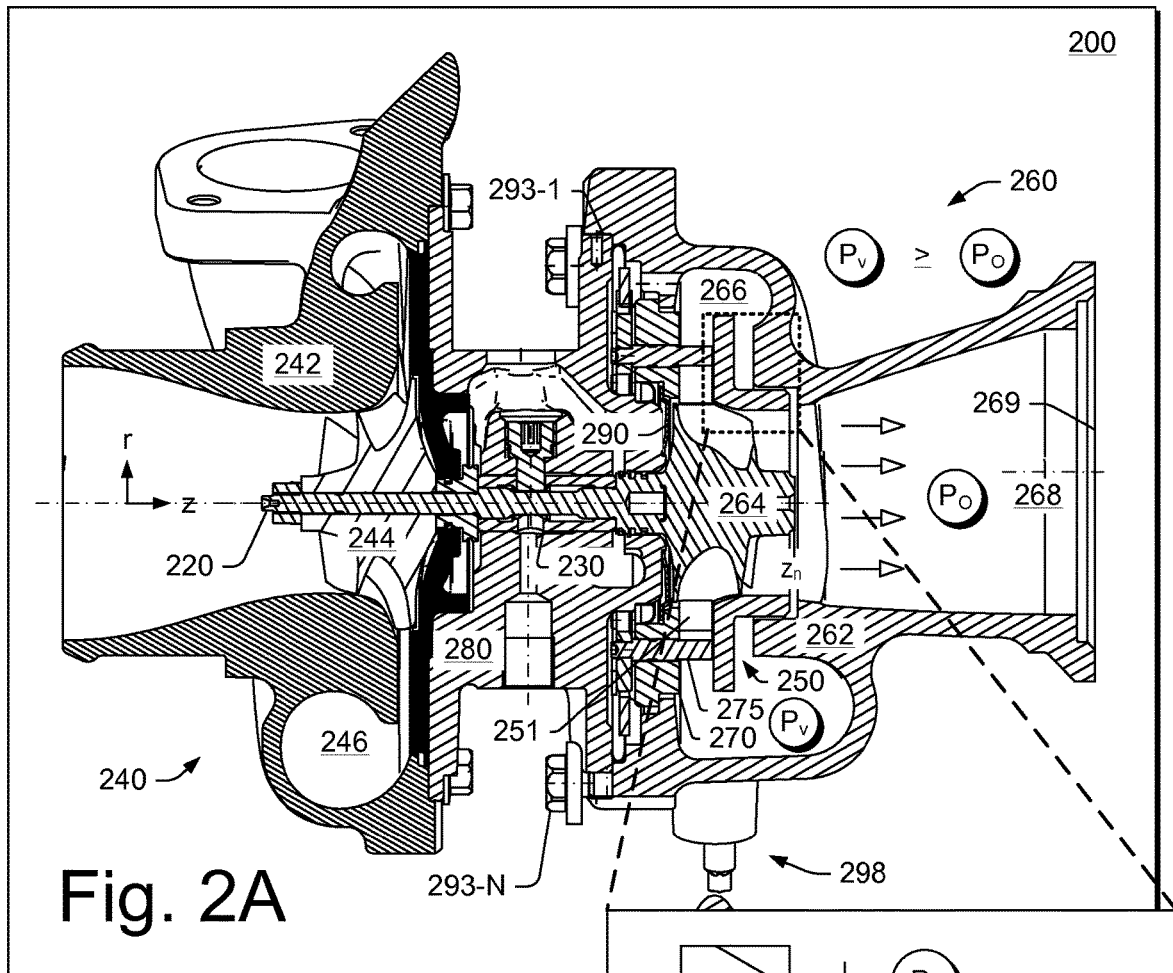
Figure 2C:
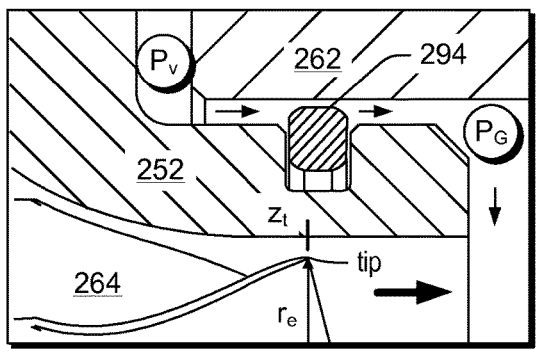
Figure 2B:
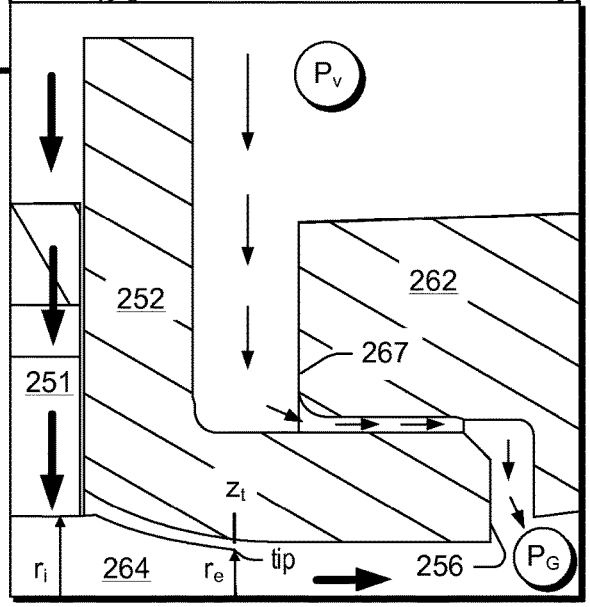

The turbine assembly 260 further includes a variable geometry assembly 250, which may be referred to as a "cartridge", that is positioned using a an annular component or flange 270 (e.g., optionally shaped as a stepped annular disc) that clamps between the housing 280 and the turbine housing 262, for example, using bolts 293-1 to 293-N and a heat shield 290 (e.g., optionally shaped as a stepped annular disc), the latter of which is disposed between the cartridge 250 and the housing 280. As shown in the example of FIGS. 2A and 2B and the example of FIG. 2C, the cartridge 250 includes a shroud component 252 and the annular component 270. As an example, one or more mounts or spacers may be disposed between the shroud component 252 and the annular component 270, for example, to axially space the shroud component 252 and the annular component 270 (e.g., forming a nozzle space).

As an example, vanes (see, e.g., a vane 251) may be positioned between the shroud component 252 and the annular component 270, for example, where a control mechanism may cause pivoting of the vanes. As an example, the vane 251 may include a vane post 275 that extends axially to operatively couple to a control mechanism, for example, for pivoting of the vane 251 about a pivot axis defined by the vane post 275. As an example, each vane may include a vane post operatively coupled to a control mechanism. In the example of FIGS. 2A and 2B, a clearance exists between an upper surface of the vane 251 and a lower surface of the shroud component 252. As mentioned, deformation of the shroud component 252 may diminish such clearance and, for example, have an effect on vane control.

As to exhaust flow, higher pressure exhaust in the volute 266 passes through passages (e.g., a nozzle or nozzles) of the cartridge 250 to reach the turbine wheel 264 as disposed in a turbine wheel space defined by the cartridge 250 and the turbine housing 262. After passing through the turbine wheel space, exhaust travels axially outwardly along a passage 268 defined by a wall of the turbine housing 262 that also defines an opening 269 (e.g., an exhaust outlet). As indicated, during operation of the turbocharger 200, exhaust pressure in the volute 266 ($P_V$) is greater than the exhaust pressure in the passage 268 ($P_O$).

As shown in the two enlarged views of FIGS. 2B and 2C, a clearance exists between the turbine housing 262 and the cartridge 250. Specifically, a clearance exists between a surface 256 of the shroud component 252 of the cartridge 250 and a surface 267 of the turbine housing 262. As mentioned, a piston ring approach to sealing a passage formed by a clearance can involve positioning a piston ring in a slot. The enlarged view of FIG. 2C (lower right) shows an example without a piston ring and the enlarged view of FIG. 2B (lower left) shows an example with a piston ring 294 positioned in an effort to seal such a passage.

As shown in FIGS. 2B and 2C, the shroud component 252 extends axially beyond an axial position ($z_t$) of a distal most blade tip of the turbine wheel 264. For example, the shroud component 252 may extend axially beyond at least a distal most blade tip position and may extend to a nose end ($z_n$) of the turbine wheel 264. As shown in FIGS. 2B and 2C, an axial gap or clearance formed between the shroud component 252 and the turbine housing 262 is located beyond a distal most blade tip axial position ($z_t$). The axial gap may be an annular outlet to an exhaust leakage pathway from the volute 266 to the passage 268. Such an outlet may be at a pressure, indicated as $P_G$, and in a region where exhaust flow may be in a transition region, for example, transitioning to a more axial direction as it exits the turbine wheel space (e.g., a space defined by a blade portion of the turbine wheel 264 and a shroud portion of the shroud component 252.

As shown in FIGS. 2A and 2B, the turbine wheel 264 can include an inducer portion and an exducer portion. In FIG. 2B, an inducer radius ($r_i$) and an exducer radius ($r_e$) are shown. As an example, an individual blade can include an inducer edge (e.g., a leading edge) and an exducer edge (e.g., a trailing edge) where an inducer edge may be oriented in a substantially axial direction and where an exducer edge may be oriented in a substantially radial direction. An inducer diameter, as may be defined by inducer edges, can exceed an exducer diameter, as may be defined by exducer edges. A turbine wheel may be defined in part by a trim value that characterizes a relationship between inducer and exducer portions.

Figure 3A:
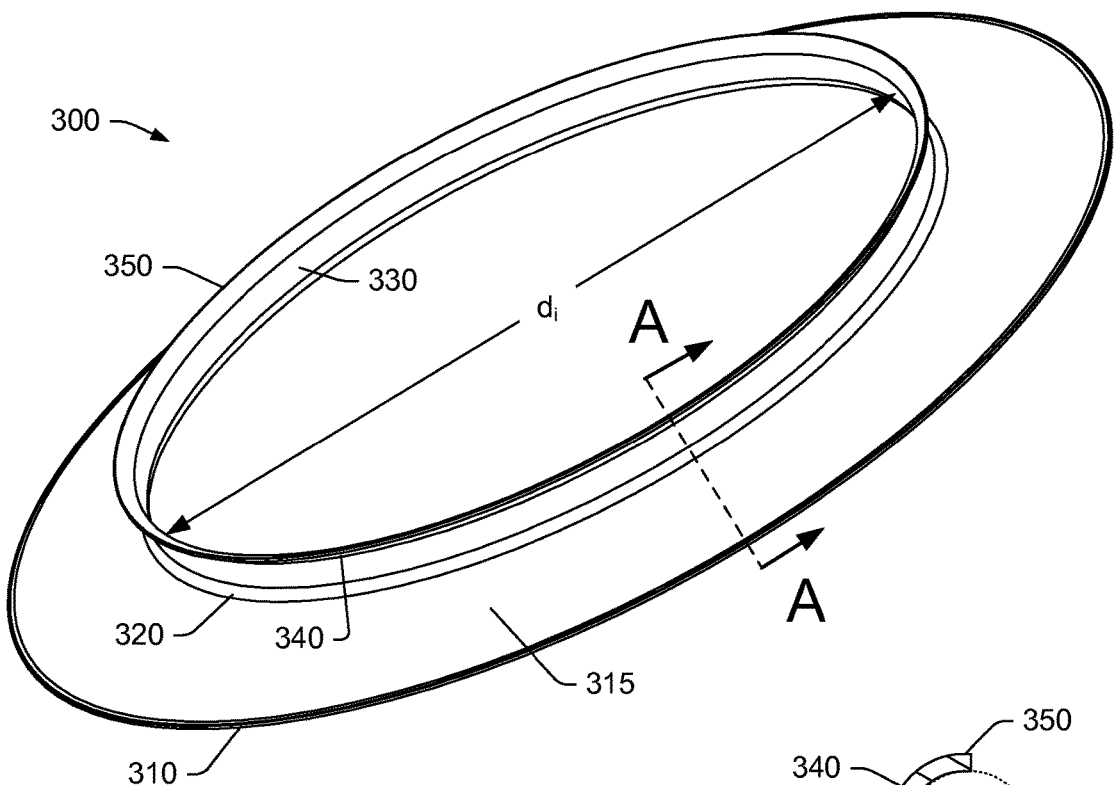
FIGS. 3A, 3B and 3C are a series of views of an example of a seal.
Figure 3C:
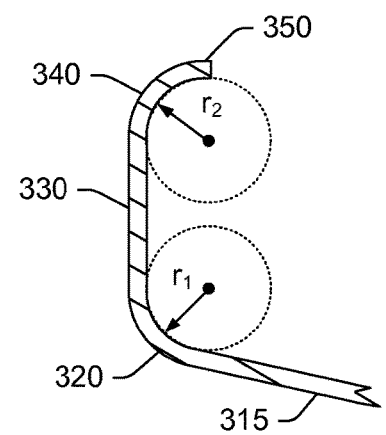
Figure 3B:
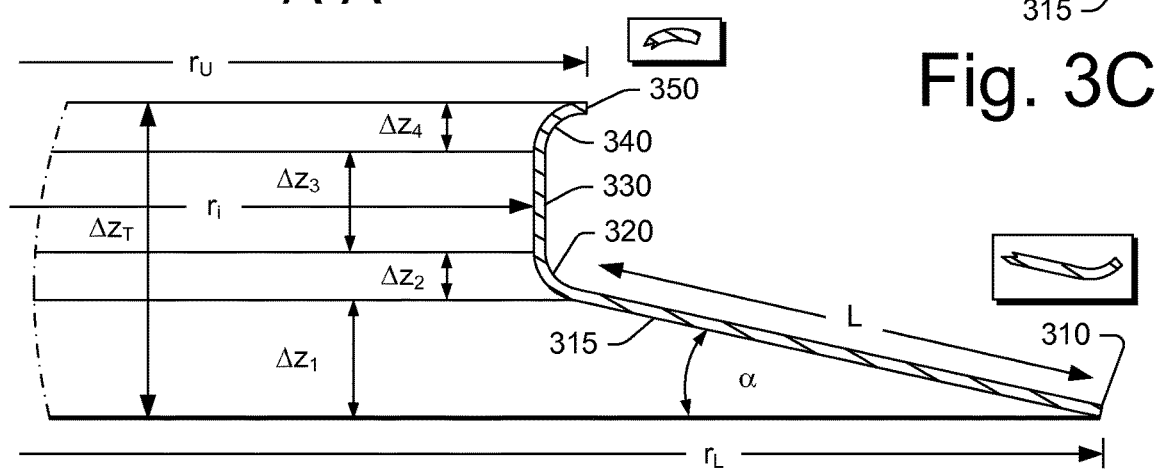

FIGS. 3A, 3B and 3C show a perspective view and cross-sectional views of an example of a seal 300. Specifically, FIG. 3B shows a cross-sectional view of the seal 300 along a line A-A and FIG. 3C shows an enlarged cross-sectional view of a portion of the seal 300 along the line A-A. As shown, the seal 300 includes a lower edge 310, an annular portion 315 disposed at an angle ($\alpha$), a lower bend 320, a cylindrical portion 330, an upper bend 340 and an upper edge 350.

As shown in FIG. 3B, the lower edge 310 may be an outermost edge that is disposed at a radius ($r_L$) and the annular portion 315 may rise axially from the lower edge 310, for example, at an angle ($\alpha$) over a length (L) (e.g., a hypotenuse of a triangle with an interior angle $\alpha$). As shown in FIG. 3C, the lower bend 320 may extend from the annular portion 315 and may be defined in part by a radius of curvature ($r_1$) and an axial dimension ($\Delta z_2$) and the upper bend 340 may extend from the cylindrical portion 330 and may be defined in part by a radius of curvature ($r_2$) and an axial dimension ($\Delta z_4$).

As an example, the cylindrical portion 330 of the seal 300 may be defined in part by a diameter (d, see also radius $r_i$) and an axial dimension ($\Delta z_3$) that is defined, for example, between an axial position of a circle from which the radius of curvature ($r_1$) of the lower bend 320 may be measured and an axial position of a circle from which the radius of curvature $r_2$ of the upper bend 340 may be measured. As an example, the edge 350 may be an edge of the upper bend 340, for example, where the edge 350 may be substantially parallel to the cylindrical portion 330. As shown in FIG. 3B, the upper edge 350 may be disposed at a radius ($r_U$) of the seal 300.

As an example, the seal 300 may be characterized in part by a spring constant. For example, force may be applied to the seal 300 such that its overall axial height ($\Delta z_T$) changes in a manner that may be substantially linear with respect to applied force (e.g., $F=-k\Delta z$ for small changes in axial height). In such an example, the angle ($\alpha$) may change as force is applied and/or released from the seal 300. In such an example, the cylindrical portion 330 may maintain a substantially axial orientation, for example, the cylindrical portion 330 may translate axially (e.g., up and down).

In the example of FIG. 3B, the angle ($\alpha$) may be an uncompressed angle of an uncompressed state of the seal 300 and the axial height ($\Delta z_T$) may be an uncompressed axial height of the uncompressed state of the seal 300. In such an example, in a compressed state, the angle ($\alpha$) and the axial height ($\Delta z_T$) may decrease. For example, where the seal 300 is disposed between a shroud component and a turbine housing component, force may be applied to the seal 300 at the lower edge 310 and/or at the upper edge 350 where such applied force causes the seal 300 to compress (e.g., in a manner that may be approximated by $F=-k\Delta z$).

As shown in FIG. 3B, as examples, the seal 300 may include a curved portion disposed between the upper bend 340 and the upper edge 350 (e.g., where the curved portion includes an upper contact surface) and/or may include a curved portion disposed between the sloped annular portion 315 and the lower edge 310 (e.g., where the curved portion includes a lower contact surface). In such examples, where the seal 300 is disposed between a shroud component and a turbine housing component, force may be applied to the seal 300 at the upper edge 350 or at an upper curved portion and at the lower edge 310 or at a lower curved portion where such applied force causes the seal 300 to compress (e.g., in a manner that may be approximated by $F=-k\Delta z$).

As an example, the seal 300 may be formed of a material that is rated to withstand temperatures of an exhaust turbine of a turbocharger. As an example, the seal 300 may be formed of a material that has a thickness as may be measured between an inner surface and an outer surface. As an example, a material may be a metal or an alloy. As an example, a material may be capable of elastic deformation responsive to applied force as may be applied between a shroud component and a turbine housing in an exhaust turbine assembly. As an example, a material may be rated for high temperature use and be substantially resistant to creep.

As an example, a metal or an alloy may be provided as a sheet that may be shaped (e.g., via stamping, rolling, etc.) to form the shape of the seal 300. As an example, the seal 300 may include ends that overlap. For example, consider passing a sheet through rollers to form a seal profile where a first end and a second end of the sheet may be overlapped to form a 360 degree seal. As another example, a sheet may be stamped to form a continuous 360 degree seal. As an example, a seal may include ends that are not overlapped and that are joined via a joining process (e.g., welding, etc.).

Figures 4A, 4B, 4C:
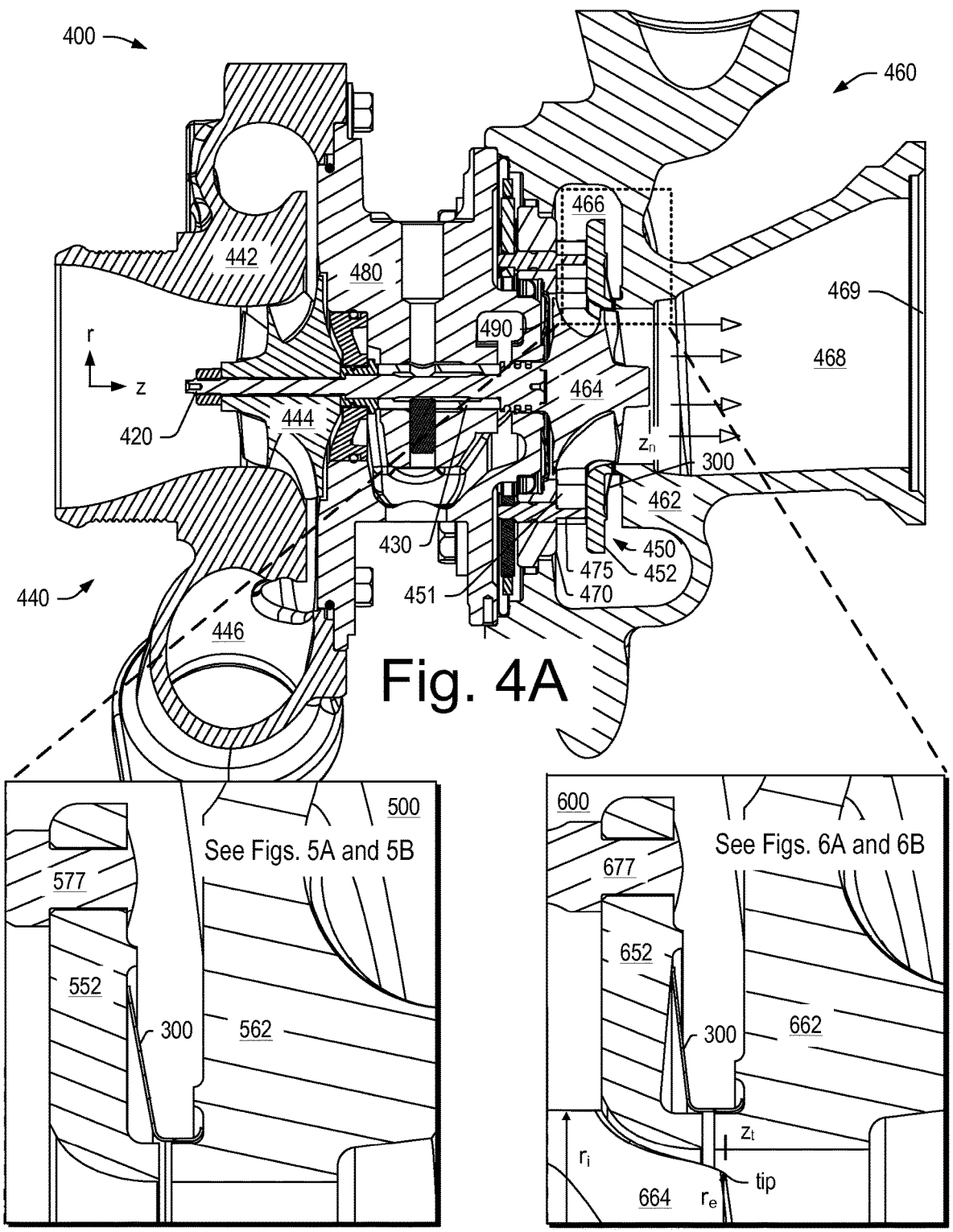
FIGS. 4A, 4B and 4C are a series of views examples of turbocharger assemblies.

FIG. 4A shows an example of a turbocharger assembly 400 that includes a shaft 420 supported by a bearing 430 (e.g., a journal bearing, a bearing assembly such as a rolling element bearing with an outer race, etc.) disposed in a bore (e.g., a through bore defined by one or more bore walls) of a housing 480 between a compressor assembly 440 and a turbine assembly 460. The compressor assembly 440 includes a compressor housing 442 that defines a volute 446 and that houses a compressor wheel 444. As shown in FIG. 4A, the turbine assembly 460 includes a turbine housing 462 that defines a volute 466 and that houses a turbine wheel 464. The turbine wheel 464 may be, for example, welded or otherwise attached to the shaft 420 to form a shaft and wheel assembly (SWA) where a free end of the shaft 420 allows for attachment of the compressor wheel 444.

The turbine assembly 460 further includes a variable geometry assembly 450, which may be referred to as a "cartridge", that is positioned using an annular component or flange 470 (e.g., optionally shaped as a stepped annular disc) that clamps between the housing 480 and the turbine housing 462, for example, using bolts and/or one or more other mechanism(s). As shown, the turbine assembly 460 includes a heat shield 490 (e.g., optionally shaped as a stepped annular disc), for example, disposed between the cartridge 450 and the housing 480.

As shown in the example of FIG. 4A, the cartridge 450 includes a shroud component 452 and the annular component 470. As an example, one or more mounts or spacers may be disposed between the shroud component 452 and the annular component 470, for example, to axially space the shroud component 452 and the annular component 470 (e.g., forming a nozzle space).

As an example, vanes (see, e.g., a vane 451) may be positioned between the shroud component 452 and the annular component 470, for example, where a control mechanism may cause pivoting of the vanes. As an example, the vane 451 may include a vane post 475 that extends axially to operatively couple to a control mechanism, for example, for pivoting of the vane 451 about a pivot axis defined by the vane post 475. As an example, each vane may include a vane post operatively coupled to a control mechanism. In the example of FIG. 4A, a clearance exists between an upper surface of the vane 451 and a lower surface of the shroud component 452. As mentioned, deformation of the shroud component 452 may diminish such clearance and, for example, have an effect on vane control.

As to exhaust flow, higher pressure exhaust in the volute 466 passes through passages (e.g., a nozzle or nozzles) of the cartridge 450 to reach the turbine wheel 464 as disposed in a turbine wheel space defined by the cartridge 450 and the turbine housing 462. After passing through the turbine wheel space, exhaust travels axially outwardly along a passage 468 defined by a wall of the turbine housing 462 that also defines an opening 469 (e.g., an exhaust outlet). During operation of the turbocharger assembly 400, exhaust pressure in the volute 466 (e.g., $P_V$) is greater than the exhaust pressure in the passage 468 (e.g., $P_O$).

In the example of FIG. 4A, the turbocharger assembly 400 includes the seal 300 where a portion of the seal 300 contacts the shroud component 452 and a portion of the seal 300 contacts the turbine housing 462. FIG. 4B shows an enlarged view of a portion of an example of an assembly 500 that includes the seal 300 (see, e.g., dotted line box in FIG. 4A for reference) and FIG. 4C shows an enlarged view of a portion of an example of an assembly 600 that includes the seal 300 (see, e.g., dotted line box in FIG. 4A for reference). The assembly 500 is also shown in FIGS. 5A and 5B and the assembly 600 is also shown in FIGS. 6A and 6B.

Figure 5A:
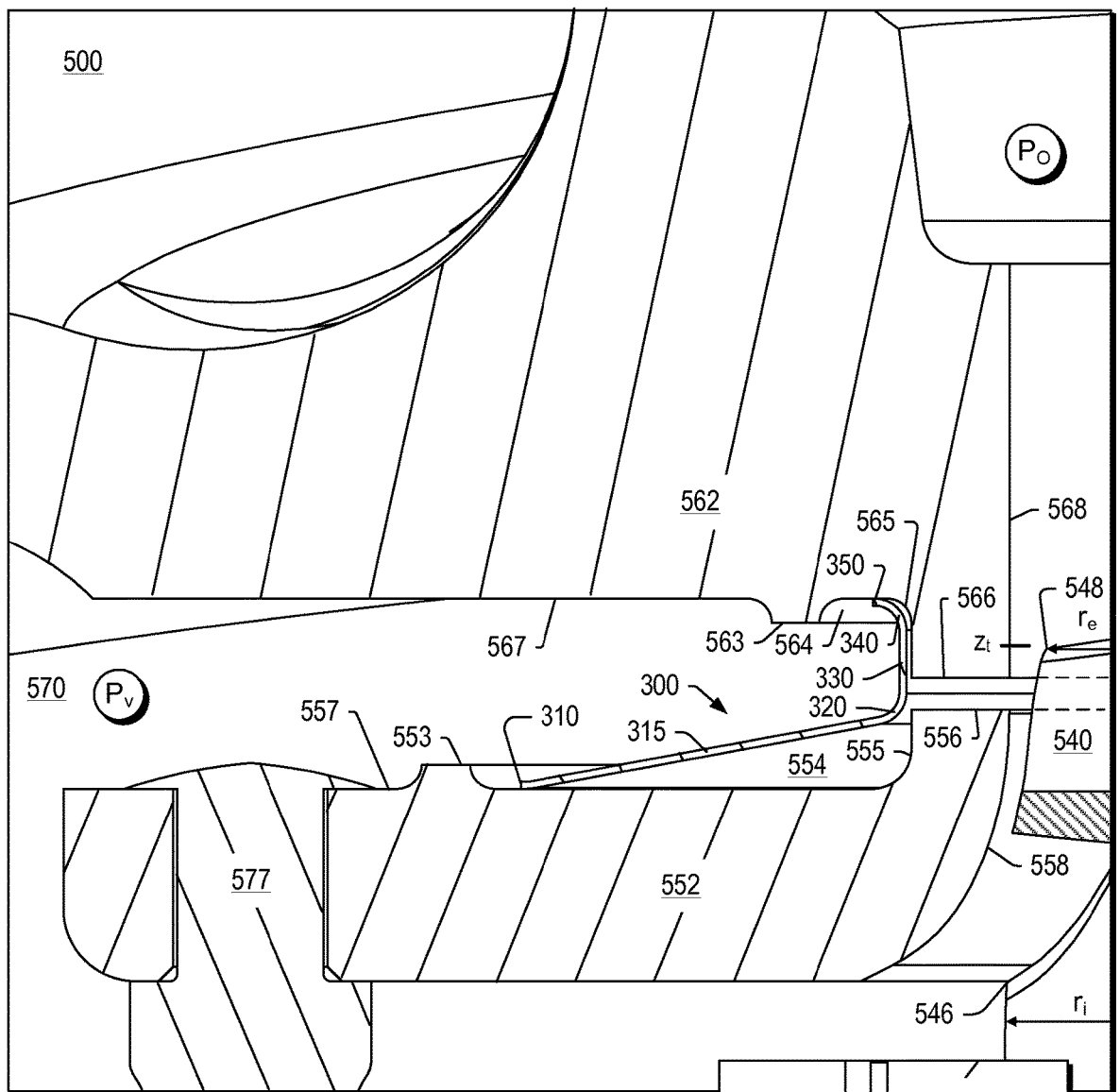
FIGS. 5A and 5B are cross-sectional views of a portion of the turbocharger assembly of FIG. 4B.
Figure 5B:
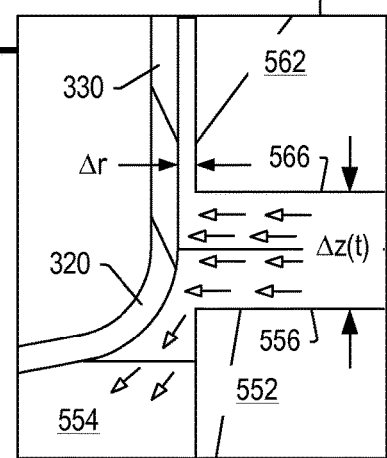
Figure 6A:
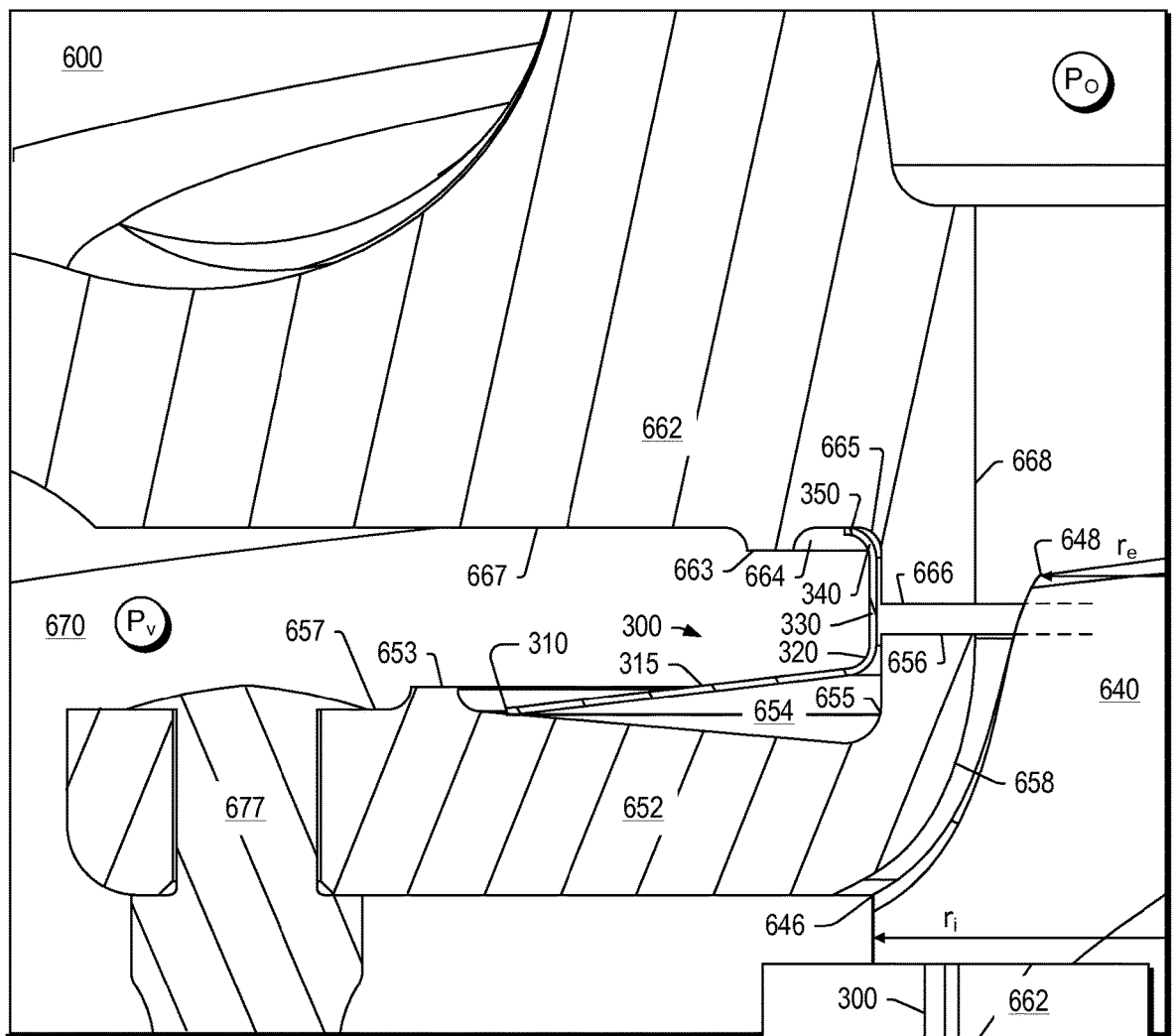
FIGS. 6A and 6B are cross-sectional views of a portion of the turbocharger assembly of FIG. 4C.
Figure 6B:
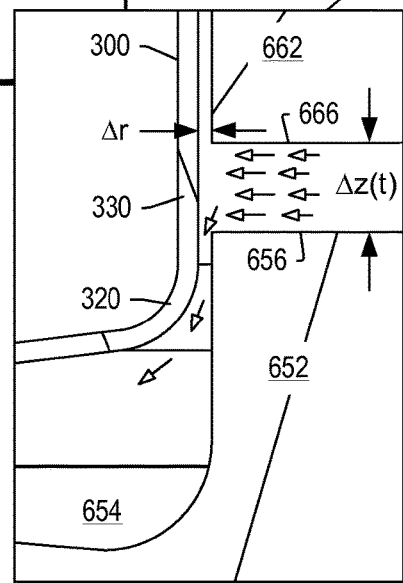

As shown in FIG. 5A, the assembly 500 includes a turbine wheel 540, a shroud component 552, a turbine housing 562, a volute 570 and a spacer 577. The turbine wheel 540 includes a rotational axis (e.g., z-axis) that extends from a base or hub end to a nose end where an inducer portion of the turbine wheel 540 is substantially axially aligned with a nozzle space defined in part by a portion of a lower surface 558 of the shroud component 552. As mentioned, vanes may be disposed in the nozzle space where, for example, the vanes are pivotable to adjust throats through which exhaust may flow from the volute 570 to the inducer portion of the turbine wheel 540.

As shown in FIG. 5A, the turbine wheel 540 can include an inducer portion radius ($r_i$) defined, for example, by a leading edge of a blade of the turbine wheel 540. The turbine wheel 540 also includes an exducer portion where blades of the turbine wheel 540, from the inducer portion to the exducer portion, may define a contour (e.g., consider a projected view of the turbine wheel 540 onto an r,z-plane). As shown in FIG. 5A, the turbine wheel 540 includes a blade tip 548 of the exducer portion where the position of the blade tip 548 may be defined by an exducer portion radius ($r_e$) and, for example, an axial position ($z_t$). As an example, the blade tip 548 may be a tip of a trailing edge of a blade of the turbine wheel 540.

As shown in FIG. 5A, the shroud component 552 includes a ridge 553 (e.g., optionally an annular ridge with an annular axial face), an annular well 554 and an annular shoulder 555 that extends to an annular axial face 556. As shown, the annular well 554 extends from the annular shoulder 555 radially outwardly to the ridge 553. Radially outwardly from the ridge 553, the shroud component 552 includes a relatively planar portion 557 where an opening therein may receive a portion of the spacer 577. Thus, in the example of FIG. 5A, a spacer opening or spacer openings of the shroud component 552 are located radially outwardly from the ridge 553 and hence the well 554. As shown in FIG. 5A, the annular axial face 556 extends radially inwardly to (e.g., or radially outwardly from) a shoulder, for example, formed by the annular axial face 556 and the lower surface 558 of the shroud component 552. As shown in FIG. 5A, the lower surface 558 includes an annular contoured portion and a relatively planar annular portion. The lower surface 558 of the shroud component 552 is shown as having a minimum radius at or proximate to a shoulder with the annular axial face 556 and as having an increasing radius with respect to decreasing axial dimension, for example, as referenced with respect to the rotational axis of the turbine wheel 540 in a direction from a nose end to a hub end of the turbine wheel 540.

As shown in FIG. 5A, the turbine housing 562 includes a ridge 563, an annular well 564 and an annular shoulder 565 that extends to an annular axial face 566. As shown, the annular well 564 extends from the annular shoulder 565 radially outwardly to the ridge 563. Radially outwardly from the ridge 563, the turbine housing 562 includes a relatively planar portion 567 that extends radially outwardly to the volute 570. As shown in FIG. 5A, the annular axial face 566 extends radially inwardly to (e.g., or radially outwardly from) a shoulder, for example, formed by the annular axial face 566 and a surface 568 of the turbine housing 562.

FIG. 5B shows an enlarged view of a portion of the assembly 500 along with various dimensions and open headed arrows that indicate possible directions of flow of exhaust, at least in part radially outwardly from the turbine wheel 540. As an example, the annular axial face 556 of the shroud component 552 and the annular axial face 566 of the turbine housing 562 may define an axial clearance or gap ($\Delta z(t)$), which may, for example, change over time responsive to environmental conditions, operational conditions, etc. Another dimension shown in FIG. 5B is a radial clearance or gap ($\Delta r$) defined by the cylindrical portion 330 of the seal 300 and a surface of the turbine housing 562 that extends axially downwardly, away from the annular shoulder 565.

As shown in FIG. 5A, the clearance or gap ($\Delta z(t)$) between the shroud component 552 and the turbine housing 562 is located axially below the axial position of the blade tip 548 of the turbine wheel 540. As an example, during operation of the assembly 500 as part of a turbocharger, the turbine wheel 540 may be rotatably driven by exhaust that flows from the volute 570 to the inducer portion of the turbine wheel 540 where a portion of the exhaust may be directed, at least in part, radially away from the turbine wheel 540 via the clearance or gap ($\Delta z(t)$) between the shroud component 552 and the turbine housing 562. In such an example, pressure may be generated in a space defined at least in part by an inner surface of the seal 300. For example, consider a space defined in part by the annular portion 315 of the seal 300 and by the well 554. In such an example, pressure in the space may act to diminish a pressure differential across the seal 300 that favors undesirable leakage of exhaust from the volute 570.

As an example, during operation of the assembly 500 as part of a turbocharger, force may be applied to the seal 300

(e.g., at or proximate to the lower edge 310 and/or the upper edge 350). In such an example, the seal 300 may be constructed with a spring constant that resists axial compression of the seal 300 to an extent that would cause the clearance or gap (Δz(t)) between the shroud component 552 and the turbine housing 562 to close (e.g., to avoid contact between the annular axial face 556 and the annular axial face 566).

As an example, the ridge 553 of the shroud component 552 may act to "deflect" flow of pressurized exhaust from the volute 570 to an interface between the seal 300 and the shroud component 552. For example, as shown in FIG. 5A, the seal 300 can form an interface with the shroud component 552 within the annular well 554, which has a surface that is axially below that of the ridge 553. As an example, the ridge 553 may be a continuous annular ridge that surrounds the lower edge 310 of the seal 300. As an example, the ridge 553 may act to hinder flow of exhaust from the volute 570 to an interface of the seal 300 and the shroud component 552 where, for example, local discontinuities may exist (e.g., due to wear, deformation, etc. of the seal 300).

As shown in FIG. 5A, a radial line-of-sight may exist between the volute 570 and the clearance or gap (Δz(t)) between the shroud component 552 and the turbine housing 562. In such an example, the seal 300 may block the line-of-sight and, for example, view of the turbine wheel 540.

As shown in FIG. 5A, the shroud component 552 may be substantially annular in shape, with a relatively small upturned portion, which may be referred to as a truncated pipe, that defines a contour (e.g., a turbine wheel shroud contour). In such an example, stresses, thermal effects, etc. may be modeled substantially via an annular plate model, for example, in comparison to a shroud component that includes a substantial cylindrical pipe portion that extends axially beyond an axial position of an exducer portion of a turbine wheel. Further, as an example, overall mass of a shroud component may be diminished by use of a "truncated" pipe.

In the example of FIGS. 5A and 5B, one or more features may act to diminish noise. For example, a radial step downstream of the seal 300 may act as a barrier for sound waves that can diminish whistling and/or shrill noises under low seal compressions or seal sheet metal discontinuities at axial lips.

As shown in FIG. 6A, the assembly 600 includes a turbine wheel 640, a shroud component 652, a turbine housing 662, a volute 670 and a spacer 677. The turbine wheel 640 includes a rotational axis (e.g., z-axis) that extends from a base or hub end to a nose end where an inducer portion of the turbine wheel 640 is substantially axially aligned with a nozzle space defined in part by a portion of a lower surface 658 of the shroud component 652. As mentioned, vanes may be disposed in the nozzle space where, for example, the vanes are pivotable to adjust throats through which exhaust may flow from the volute 670 to the inducer portion of the turbine wheel 640.

As shown in FIG. 6A, the turbine wheel 640 can include an inducer portion radius ($r_i$) defined, for example, by a leading edge of a blade of the turbine wheel 640. The turbine wheel 640 also includes an exducer portion where blades of the turbine wheel 640, from the inducer portion to the exducer portion, may define a contour (e.g., consider a projected view of the turbine wheel 640 onto an r,z-plane). As shown in FIG. 6A, the turbine wheel 640 includes a blade tip 648 of the exducer portion where the position of the blade tip 648 may be defined by an exducer portion radius ($r_e$) and, for example, an axial position ($z_t$). As an example, the blade tip 648 may be a tip of a trailing edge of a blade of the turbine wheel 640.

As shown in FIG. 6A, the shroud component 652 includes a ridge 653 (e.g., optionally an annular ridge with an annular axial face), an annular well 654 and an annular shoulder 655 that extends to an annular axial face 656. As shown, the annular well 654 extends from the annular shoulder 655 radially outwardly to the ridge 653. In the example of FIG. 5A, the annular well 554 is illustrated as including a substantially flat surface (e.g., planar at a constant axial position); whereas, in the example of FIG. 6A, the annular well 654 is illustrated as including a sloped or slanted surface, which rises axially upwardly when moving in a direction from the annular shoulder 655 toward the ridge 653. The shape of a well of a shroud component may be formed to define a desired space that may, for example, be a pressurizable space via exhaust directed at least in part radially outwardly from a turbine wheel.

As an example, the shape of a well surface may have an effect on a seal. For example, where a seal is compressed, an angle (see, e.g., the angle (α)) may diminish and, for example, a lower edge of the seal may exert force at least in part with a radially outwardly force component (e.g., as in a force vector diagram). Where the lower edge of the seal forms an interface with a slanted surface such as that of the well 654 of the shroud component 652 of FIG. 6A, the slanted surface may act to resist (e.g., counter act) the radially outwardly directed force component more so than when compared to an interface formed with a flat surface such as that of the well 554 of the shroud component 552 of FIG. 5A.

As an example, dynamic and/or static behavior of a seal may be tailored, at least in part, via a shape of a surface with which the seal can form an interface. As shown in FIGS. 5A and 6A, a surface may be a surface of a well that is positioned radially between an annular shoulder and a ridge. As illustrated in FIG. 6A, such a surface may be sloped with slope that is opposite in sign of a slope of the annular portion 315 of the seal 300. For example, where an annular portion of a seal includes a slope with an angle (α), a seal interface surface of a shroud component may include a slope with an opposite angle (e.g., −α).

As shown in FIG. 6A, radially outwardly from the ridge 653, the shroud component 652 includes a relatively planar portion 657 where an opening therein may receive a portion of the spacer 677. Thus, in the example of FIG. 6A, a spacer opening or spacer openings of the shroud component 652 are located radially outwardly from the ridge 653 and hence the well 654. As shown in FIG. 6A, the annular axial face 656 extends radially inwardly to (e.g., or radially outwardly from) a shoulder, for example, formed by the annular axial face 656 and the lower surface 658 of the shroud component 652. As shown in FIG. 6A, the lower surface 658 includes an annular contoured portion and a relatively planar annular portion. The lower surface 658 of the shroud component 640 is shown as having a minimum radius at or proximate to a shoulder with the annular axial face 656 and as having an increasing radius with respect to decreasing axial dimension, for example, as referenced with respect to the rotational axis of the turbine wheel 640 in a direction from a nose end to a hub end of the turbine wheel 640.

As shown in FIG. 6A, the turbine housing 662 includes a ridge 663, an annular well 664 and an annular shoulder 665 that extends to an annular axial face 666. As shown, the annular well 664 extends from the annular shoulder 665 radially outwardly to the ridge 663. Radially outwardly from the ridge 663, the turbine housing 662 includes a relatively planar portion 667 that extends radially outwardly to the volute 670. As shown in FIG. 6A, the annular axial face 666 extends radially inwardly to (e.g., or radially outwardly from) a shoulder, for example, formed by the annular axial face 666 and a surface 668 of the turbine housing 662.

FIG. 6B shows an enlarged view of a portion of the assembly 600 along with various dimensions and open headed arrows that indicate possible directions of flow of exhaust, at least in part radially outwardly from the turbine wheel 640. As an example, the annular axial face 656 of the shroud component 652 and the annular axial face 666 of the turbine housing 662 may define an axial clearance or gap ($\Delta z(t)$), which may, for example, change over time responsive to environmental conditions, operational conditions, etc. Another dimension shown in FIG. 6B is a radial clearance or gap ($\Delta r$) defined by the cylindrical portion 330 of the seal 300 and a surface of the turbine housing 662 that extends axially downwardly, away from the annular shoulder 665. Another radial clearance or gap (e.g., approximately the same size as the clearance or gap ($\Delta r$)) may be defined by the cylindrical portion 330 of the seal 300 and a surface of the shroud component 652 that extends axially downwardly, away from the annular axial face 656.

As shown in FIG. 6A, the clearance or gap ($\Delta z(t)$) between the shroud component 652 and the turbine housing 662 is located axially below the axial position of the blade tip 648 of the turbine wheel 640. As an example, during operation of the assembly 600 as part of a turbocharger, the turbine wheel 640 may be rotatably driven by exhaust that flows from the volute 670 to the inducer portion of the turbine wheel 640 where a portion of the exhaust may be directed, at least in part, radially away from the turbine wheel 640 via the clearance or gap ($\Delta z(t)$) between the shroud component 652 and the turbine housing 662. In such an example, pressure may be generated in a space defined at least in part by an inner surface of the seal 300. For example, consider a space defined in part by the annular portion 315 of the seal 300 and by the well 654. In such an example, pressure in the space may act to diminish a pressure differential across the seal 300 that favors undesirable leakage of exhaust from the volute 670.

As an example, during operation of the assembly 600 as part of a turbocharger, force may be applied to the seal 300 (e.g., at or proximate to the lower edge 310 and/or the upper edge 350). In such an example, the seal 300 may be constructed with a spring constant that resists axial compression of the seal 300 to an extent that would cause the clearance or gap ($\Delta z(t)$) between the shroud component 652 and the turbine housing 662 to close (e.g., to avoid contact between the annular axial face 656 and the annular axial face 666).

As an example, the ridge 653 of the shroud component 652 may act to "deflect" flow of pressurized exhaust from the volute 670 to an interface between the seal 300 and the shroud component 652. For example, as shown in FIG. 6A, the seal 300 can form an interface with the shroud component 652 within the annular well 654, which has a surface that is axially below that of the ridge 653. As an example, the ridge 653 may be a continuous annular ridge that surrounds the lower edge 310 of the seal 300. As an example, the ridge 653 may act to hinder flow of exhaust from the volute 670 to an interface of the seal 300 and the shroud component 652 where, for example, local discontinuities may exist (e.g., due to wear, deformation, etc. of the seal 300).

As shown in FIG. 6A, a radial line-of-sight may exist between the volute 670 and the clearance or gap ($\Delta z(t)$) between the shroud component 652 and the turbine housing 662. In such an example, the seal 300 may block the line-of-sight and, for example, view of the turbine wheel 640.

As shown in FIG. 6A, the shroud component 652 may be substantially annular in shape, with a relatively small upturned portion, which may be referred to as a truncated pipe, that defines a contour (e.g., a turbine wheel shroud contour). In such an example, stresses, thermal effects, etc. may be modeled substantially via an annular plate model, for example, in comparison to a shroud component that includes a substantial cylindrical pipe portion that extends axially beyond an axial position of an exducer portion of a turbine wheel. Further, as an example, overall mass of a shroud component may be diminished by use of a "truncated" pipe.

As an example, a turbine assembly of a turbocharger can include a shroud component that is at least in part axially biased by at least one seal. In such an example, the shroud component may move axially during operation, for example, responsive to environmental and/or operational conditions. In such an example, the shroud component may include an axial end position that is less than an axial position of a trailing edge of a blade of a turbine wheel of the turbine assembly. For example, a shroud component may include an axial end position that is less than an axial position of an exducer portion of a turbine wheel.

Figure 7:
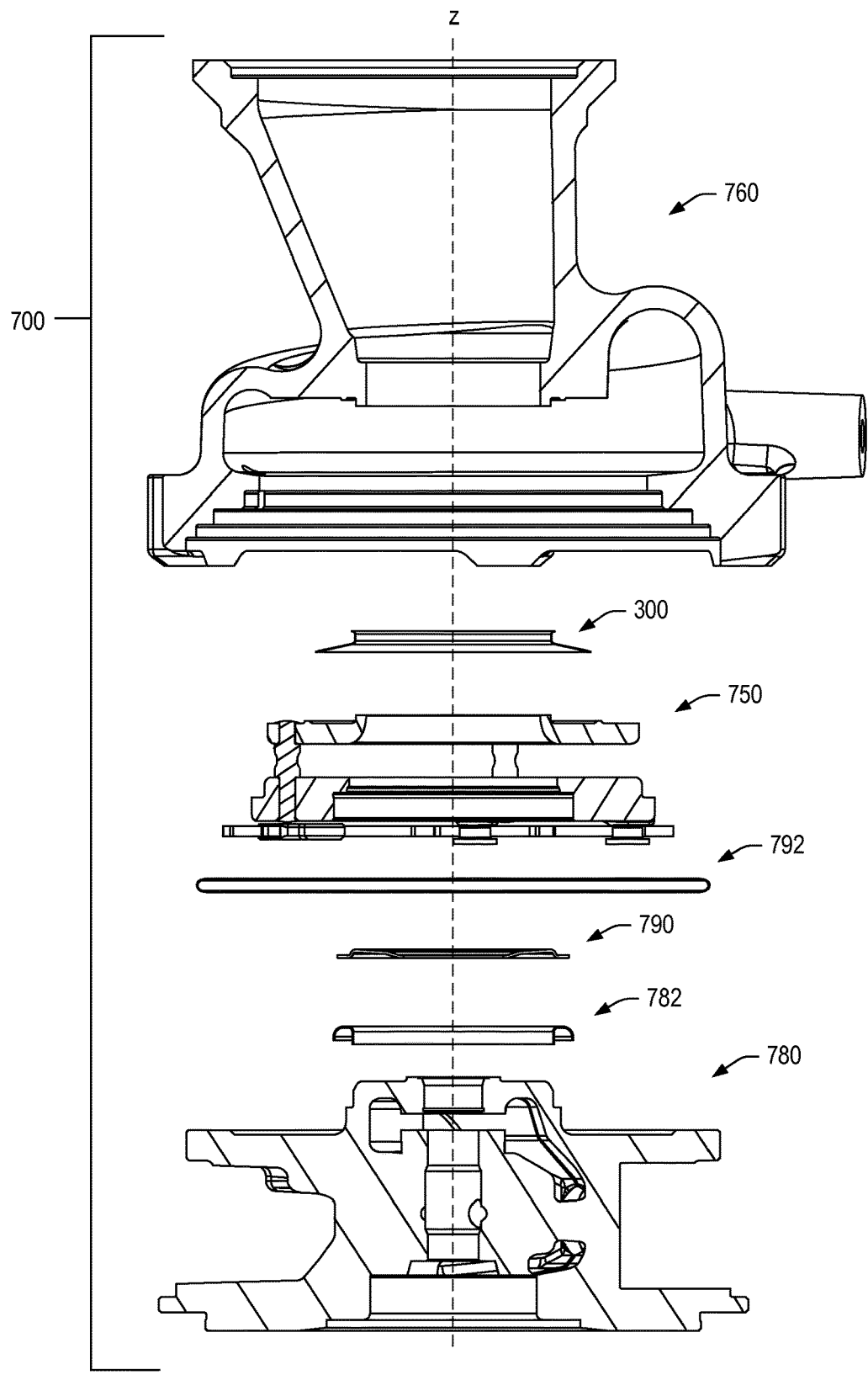
FIG. 7 is an exploded view of an example of a turbocharger assembly.

FIG. 7 shows an exploded cutaway view of an assembly 700 that includes the seal 300, a cartridge 750, a turbine housing 760, a center housing 780, a component 782, a component 790 and a component 792. A common axis (z-axis) is shown, which is a longitudinal axis of a bore of the center housing 780 and a central axis of the seal 300. As an example, the component 790 may contact the cartridge 750 where the component 790 may have a spring constant (e.g., be elastically deformable). As an example, when assembled, the cartridge 750 may be axially biased between the center housing 780 and the turbine housing 760 via the component 790 and the seal 300. As an example, the turbine housing 760 may be clamped to the center housing 780 such that a gapless interface is formed therebetween. For example, the turbine housing 760 may be coupled and axially fixed to the center housing 780. As an example, the component 790 may exert a force (e.g., a load) to the cartridge 750 that is reacted by the turbine housing 760. As an example, the seal 300 may be more flexible than that the component 790 such that the seal 300 compresses (e.g., achieves a compressed state) when subject to loading in an assembled state of the assembly 700 (e.g., at least in part via force exerted by the component 790). As an example, the seal 300 may be elastically deformable, for example, to be compressed to a compressed state in an assembly and to return to an uncompressed state upon disassembly of the assembly (e.g., removal of the seal 300 from the assembly).

Figure 8:
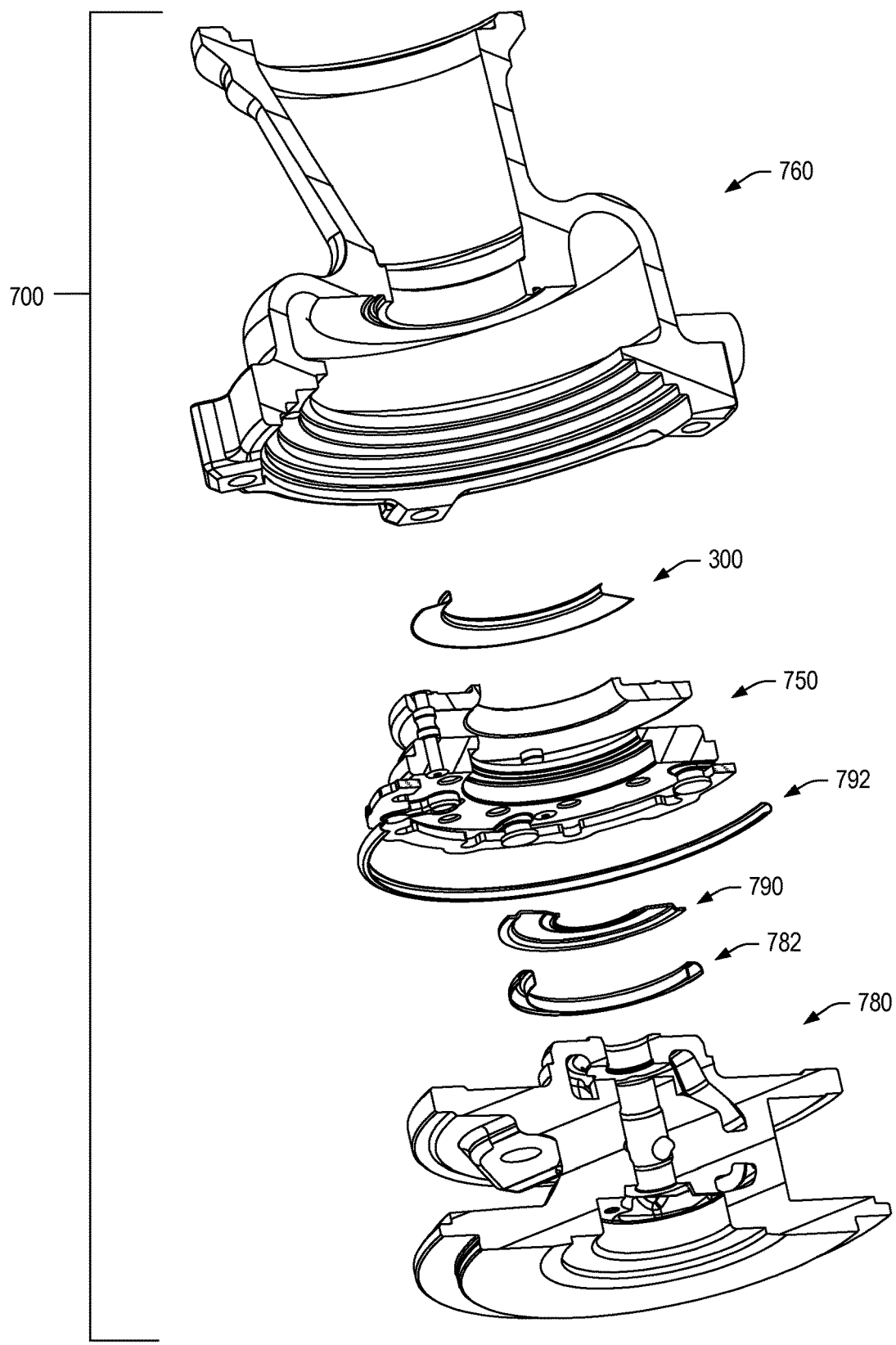
FIG. 8 is an exploded view of an example of the turbocharger assembly of FIG. 7.

FIG. 8 shows the assembly 700 of FIG. 7 in an exploded, perspective cutaway view. In the view of FIG. 8, a lower surface of the turbine housing 760 is illustrated that may contact an upper surface of the seal 300 (e.g., the upper edge 350 of the seal 300). In the view of FIG. 8, a lower surface of the cartridge 750 is illustrated that may contact an upper surface of the component 790. As an example, a lower surface of the component 790 may contact (e.g., directly or indirectly) an upper surface of the center housing 780. Also shown in FIG. 8 are post openings of the cartridge 750 that may receive posts that can pivotably adjust vanes. The cartridge 750 may include a unison ring as part of a mechanism that can rotate posts to pivotably adjust vanes (e.g., throats defined by adjacent vanes).

Figure 9:
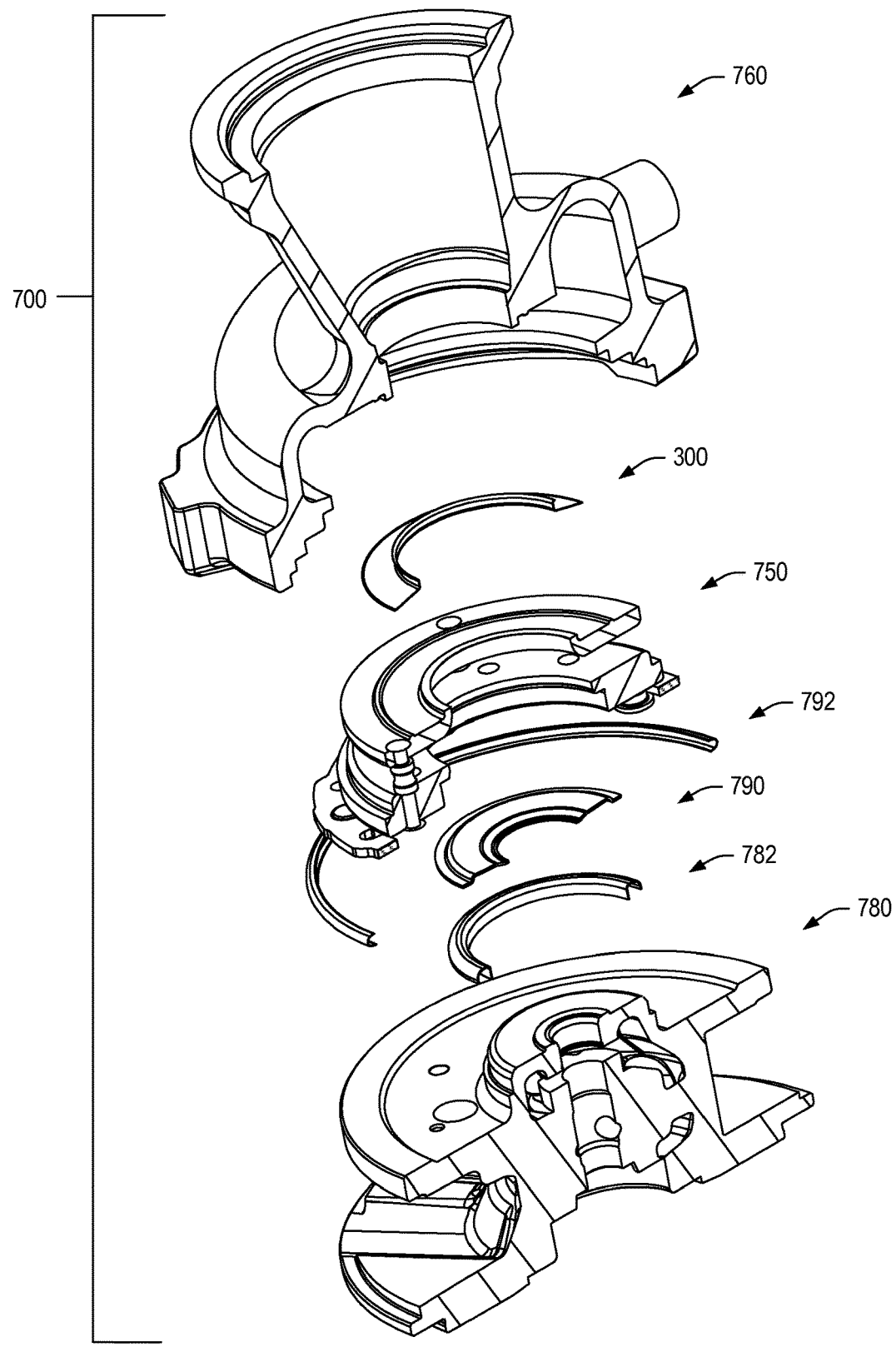
FIG. 9 is an exploded view of an example of the turbocharger assembly of FIG. 7.

FIG. 9 shows the assembly 700 of FIG. 7 in an exploded, perspective cutaway view. In the view of FIG. 9, an upper surface of the cartridge 750 is illustrated that may contact a lower surface of the seal 300 (e.g., the lower edge 310 of the seal 300).

Figure 10A:
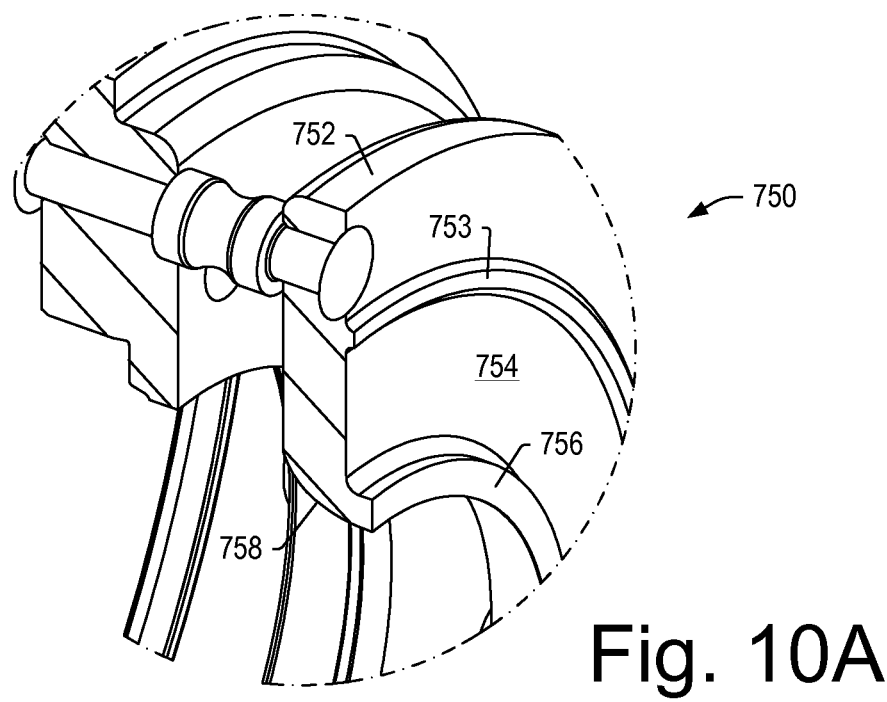
FIGS. 10A and 10B are enlarged views of portions of the turbocharger assembly of FIG. 7.
Figure 10B:
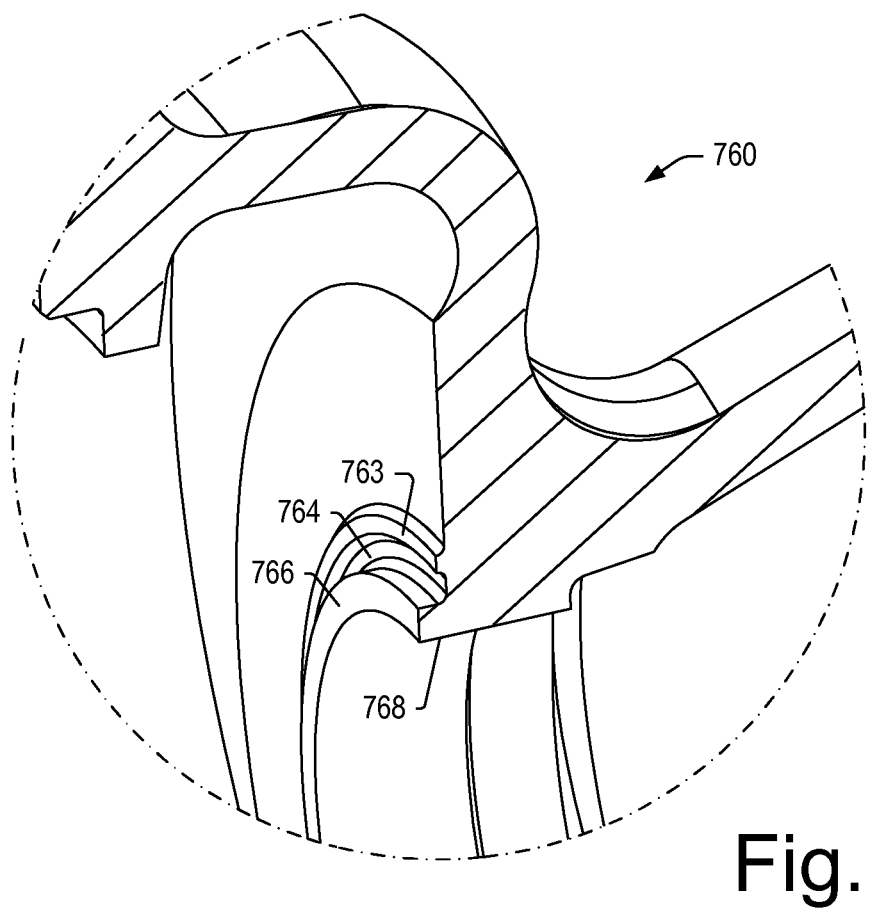

FIGS. 10A and 10B show a portion of the cartridge 750 and a portion of the turbine housing 760, respectively. As shown in FIG. 10A, the cartridge 750 includes a shroud component 752 that includes an annular ridge 753, an annular well 754 and an annular axial face 756. As shown in FIG. 10B, the turbine housing 760 includes an annular ridge 763, an annular well 764 and an annular axial face 766. As an example, the seal 300 may be disposed between the cartridge 750 and the turbine housing 760 where the seal 300 forms an interface with the annular well 754 of the shroud component 752 and forms an interface with the annular well 764 of the turbine housing 760. In such an example, the seal 300 may provide an axial clearance or gap between the annular axial face 756 and the annular axial face 766. Such a clearance or gap may be axially at a level of a turbine wheel, for example, between an exducer portion and an inducer portion of the turbine wheel. As an example, such a clearance or gap may be axially at a level of a turbine wheel that is less than an outer tip of a trailing edge of a blade of the turbine wheel (e.g., axially between the outer tip of a trailing edge of a blade and an outer tip of a leading edge of a blade).

Figure 11A:
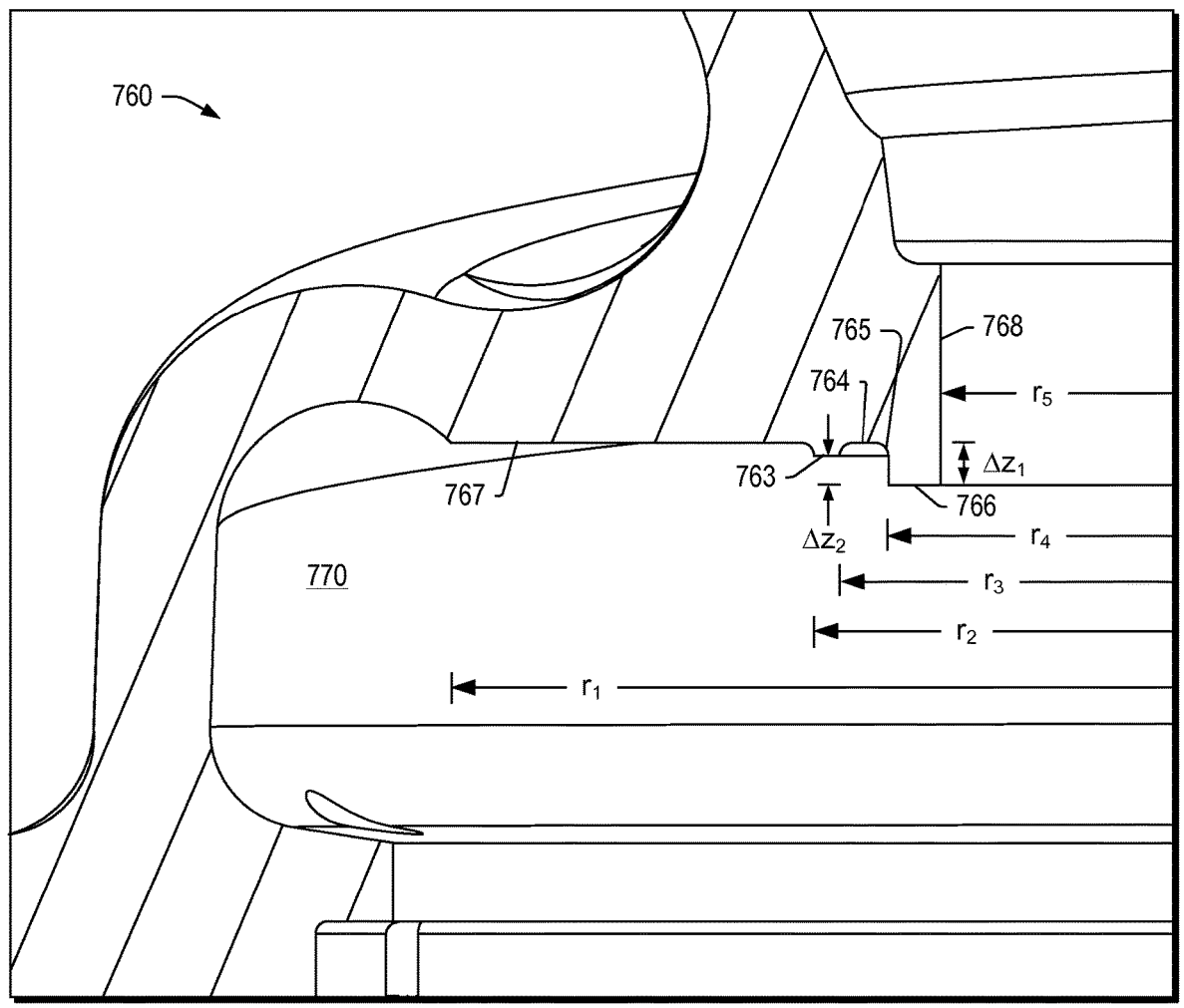
FIGS. 11A and 11B are enlarged views of portions of the turbocharger assembly of FIG. 7.
Figure 11B:
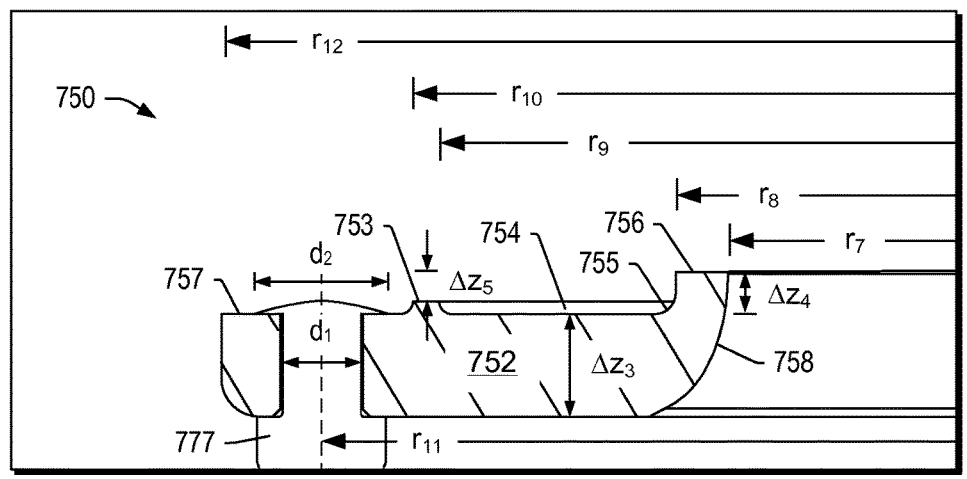

FIGS. 11A and 11B show cutaway views of a portion of the turbine housing 760 and a portion of the cartridge 750, respectively. As shown in FIG. 11A, the turbine housing 760 defines a portion of a volute 770, which is illustrated in FIGS. 7, 8 and 9 as a scroll with decreasing cross-sectional flow area. For example, a volute may be defined in part by a wall of a turbine housing where the wall may include a relatively cylindrical portion of decreasing axial dimension and an arched portion.

As shown in FIG. 11A, the turbine housing 760 includes a ridge 763, an annular well 764 and an annular shoulder 765 that extends to an annular axial face 766. As shown, the annular well 764 extends from the annular shoulder 765 radially outwardly to the ridge 763. Radially outwardly from the ridge 763, the turbine housing 760 includes a relatively planar portion 767 (e.g., a planar surface) that extends radially outwardly to the volute 770. As shown in FIG. 11A, the annular axial face 766 extends radially inwardly to (e.g., or radially outwardly from) a shoulder, for example, formed by the annular axial face 766 and a surface 768 of the turbine housing 760.

As shown in FIG. 11A, an arched portion of a wall of the turbine housing 760, which defines in part the volute 770, forms an annular shoulder with the planar portion 767 of the turbine housing 760. FIG. 11A shows various dimensions including a shoulder radius ($r_1$), an outer ridge radius ($r_2$), an inner ridge radius ($r_3$), a shoulder radius ($r_4$) and a turbine space wall radius ($r_5$). Also shown in FIG. 11A are an axial dimension ($\Delta z_1$) from the well 764 to the axial face 766 and an axial dimension ($\Delta z_2$) from the ridge 763 to the axial face 766.

As shown in FIG. 11B, the cartridge 750 includes a shroud component 752, which includes a ridge 753 (e.g., optionally an annular ridge with an annular axial face), an annular well 754 and an annular shoulder 755 that extends to an annular axial face 756. As shown, the annular well 754 extends from the annular shoulder 755 radially outwardly to the ridge 753. Radially outwardly from the ridge 753, the shroud component 752 includes a relatively planar portion 557 (e.g., a planar surface) where an opening therein may receive a portion of the spacer 777. Thus, in the example of FIG. 11B, a spacer opening or spacer openings of the shroud component 752 are located radially outwardly from the ridge 753 and hence the well 754. As shown in FIG. 11B, the annular axial face 756 extends radially inwardly to (e.g., or radially outwardly from) a shoulder, for example, formed by the annular axial face 756 and the lower surface 758 of the shroud component 752. As shown in FIG. 11B, the lower surface 758 includes an annular contoured portion and a relatively planar annular portion. The lower surface 758 of the shroud component 752 is shown as having a minimum radius ($r_7$) at or proximate to a shoulder with the annular axial face 756 and as having an increasing radius with respect to decreasing axial dimension, for example, as referenced with respect to a rotational axis of a turbine wheel in a direction from a nose end to a hub end of the turbine wheel (e.g., or an axis of a turbine wheel space opening defined by the contoured portion of the lower surface 758).

FIG. 11B shows various dimensions including the minimum radius ($r_7$), a shoulder radius ($r_8$), an inner ridge radius ($r_9$), an outer ridge radius ($r_{10}$), a spacer opening radius ($r_{11}$) and an outer edge radius ($r_{12}$). Also shown in FIG. 11B are an axial dimension ($\Delta z_4$) from the well 754 to the axial face 756 and an axial dimension ($\Delta z_5$) from the ridge 753 to the axial face 756. Further shown in FIG. 11B are a spacer opening diameter ($d_1$) and a spacer head diameter ($d_2$).

As shown in FIGS. 11A and 11B, the shroud component 752 and the turbine housing 760 may each include a ridge 753 and 763, a well 754 and 764 and an axial face 756 and 766. The radial positions of the ridges 753 and 763 may be selected to accommodate a seal such as the seal 300. For example, the ridge 763 may be at a radius greater than an upper edge of a seal and the ridge 753 may be at a radius greater than a lower edge of a seal where, for example, the lower edge of the seal is at a radius that exceeds the upper edge of the seal.

As an example, upon assembly of the cartridge 750 and the turbine housing 760, an axial gap may be formed between the axial faces 756 and 766. As an example, a seal may include a cylindrical portion that is at least in part axially even with the axial gap formed between the axial faces 756 and 766 while the seal interfaces with the shroud component 752 and the turbine housing 760, for example, in wells 754 and 764, to seal the axial gap from the volute 770.

Figure 12A:
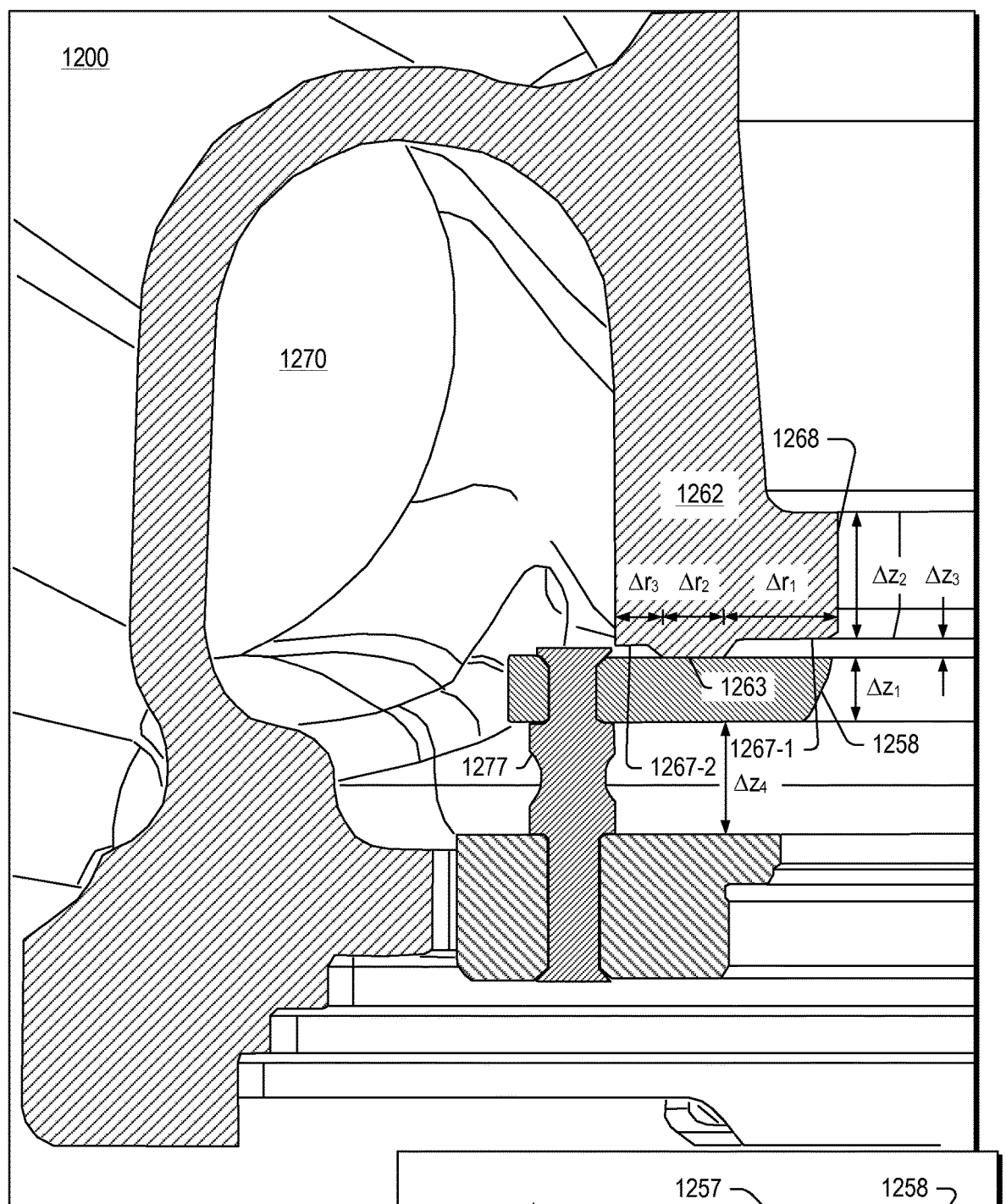
FIGS. 12A and 12B are cross-sectional views of an example of a turbocharger assembly.
Figure 12B:
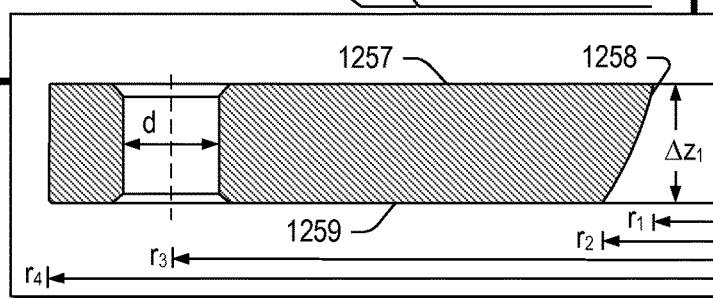

FIGS. 12A and 12B show a cutaway view of a portion of an assembly 1200 that includes a shroud component 1252, a turbine housing 1262 and a volute 1270 and an enlarged cross-sectional view of a portion of the shroud component 1252. As shown in FIG. 12A, the shroud component 1252 includes a surface 1258 disposed over an axial distance ($\Delta z_1$) and the turbine housing 1262 includes a surface 1268 disposed over an axial distance ($\Delta z_2$). As shown in FIG. 12A, an axial gap exists between an upper edge of the surface 1258 and a lower edge of the surface 1268, which may optionally include a chamfer, a radius, etc. As an example, a turbine wheel may be disposed in a turbine wheel space defined in part by the shroud component 1252 and the turbine housing 1262 where the axial gap is disposed axially between an exducer portion and an inducer portion of the turbine wheel. For example, the axial gap may be disposed axially above an axial position of a tip of a leading edge of a blade of the turbine wheel and axially below an axial position of a tip of a trailing edge of the blade of the turbine wheel.

As shown in FIG. 12B, the shroud component 1252 has an annular shape with a planar upper surface 1257 and a planar lower surface 1259 where the surface 1258 extends between an inner end of the planar upper surface 1257 and an inner end of the planar lower surface 1259. As shown in FIG. 12B, the shroud component 1252 may be defined by various radii including an innermost radius ($r_1$) (e.g., at or proximate to an upper edge of the surface 1258), an intermediate radius ($r_2$) (e.g., at or proximate to a lower edge of the surface 1258), a spacer opening radius ($r_3$) (e.g., to an axis of a spacer opening of dimension d) and an outermost radius ($r_4$) (e.g., at a surface or an edge within the volute 1270 of the assembly 1200).

As shown in FIG. 12A, the turbine housing 1262 includes an annular ridge 1263 that can form an interface with the planar upper surface 1257 of the shroud component 1252. For example, the ridge 1263 may form a seal interface with the shroud component 1252 to hinder flow of exhaust from the volute 1270 to the axial gap between the surfaces 1258 and 1268 (e.g., an assembly with a single seal interface). As shown in FIG. 12A, the ridge 1263 may be defined by an inner radius and an outer radius as well as an axial height (see, e.g., $\Delta r_1$, $\Delta r_2$, $\Delta r_3$ and $\Delta z_3$). For example, the ridge 1263 may be disposed radially between an end of a lower surface 1267-1 (e.g., radially inward from the ridge 1263) and an end of a lower surface 1267-2 (e.g., radially outward from the ridge 1263) of the turbine housing 1262. As an example, the ridge 1263 may include sloping portions with a flat portion disposed therebetween. As an example, a turbine housing may include a plurality of ridges where, for example, one or more of the ridges may form a seal interface (e.g., with a shroud component). As an example, a turbine housing may include a concentric ridges where at least one of the concentric ridges contacts a surface of a shroud component to form a seal interface.

As an example, the shroud component 1252 may be part of a cartridge that is supported at least in part by a resilient component (e.g., an elastically deformable component). In such an example, the resilient component (see, e.g., the component 790 of FIG. 7) may apply a biasing force that acts to bias the shroud component 1252 against the ridge 1263, for example, to maintain a seal interface.

Figure 13A:
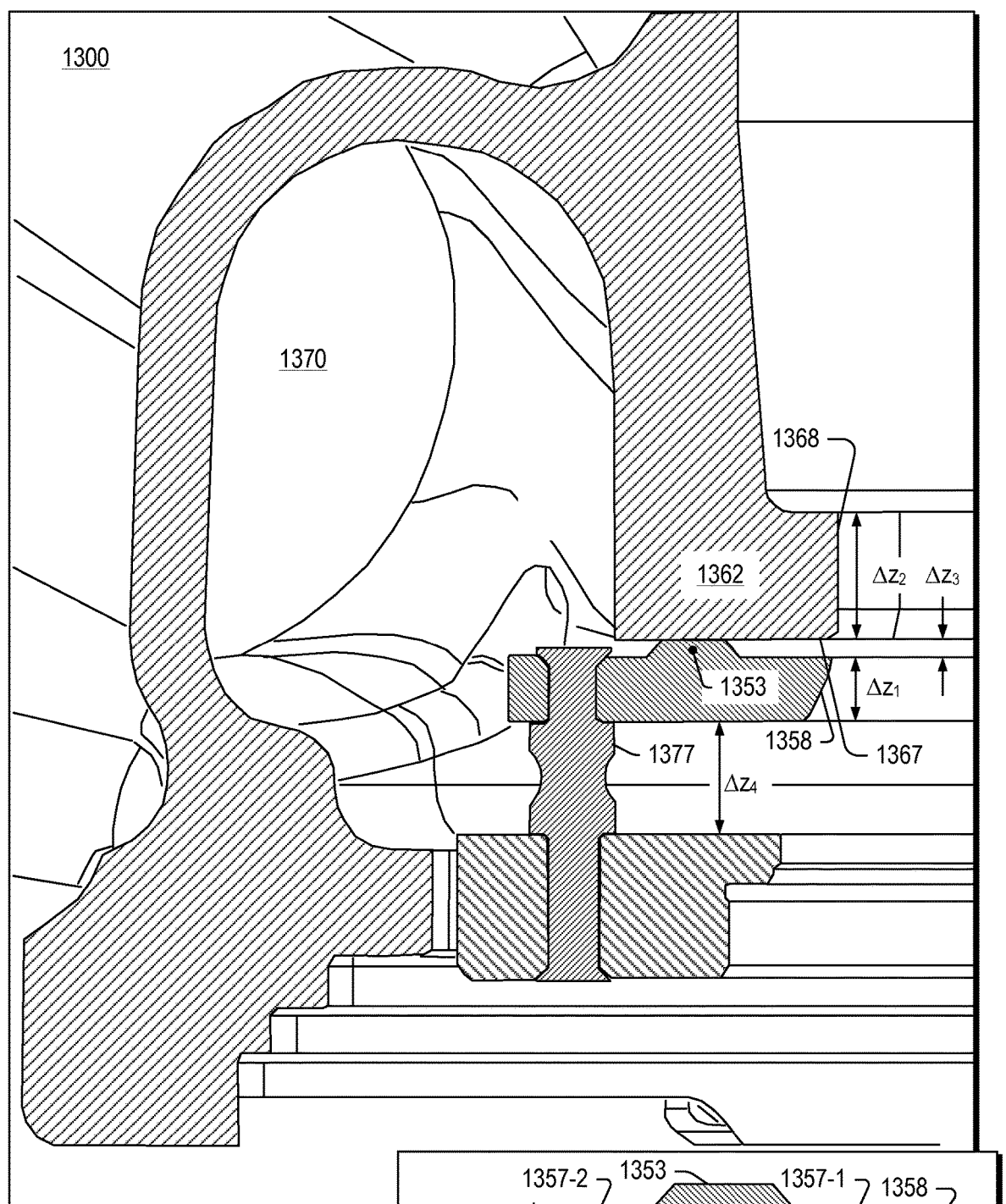
FIGS. 13A and 13B are cross-sectional views of an example of a turbocharger assembly.
Figure 13B:
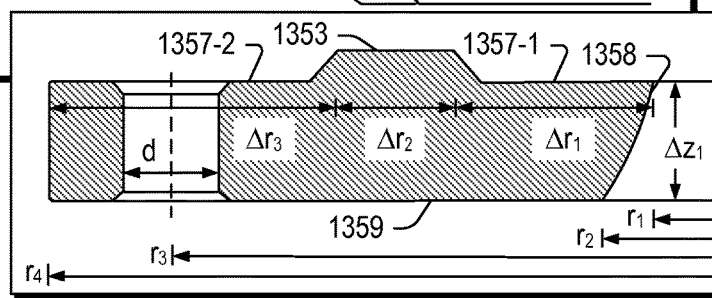

FIGS. 13A and 13B show a cutaway view of a portion of an assembly 1300 that includes a shroud component 1352, a turbine housing 1362 and a volute 1370 and an enlarged cross-sectional view of a portion of the shroud component 1352. As shown in FIG. 13A, the shroud component 1352 includes a surface 1358 disposed over an axial distance ($\Delta z_1$) and the turbine housing 1362 includes a surface 1368 disposed over an axial distance ($\Delta z_2$). As shown in FIG. 13A, an axial gap exists between an upper edge of the surface 1358 and a lower edge of the surface 1368, which may optionally include a chamfer, a radius, etc. As an example, a turbine wheel may be disposed in a turbine wheel space defined in part by the shroud component 1352 and the turbine housing 1362 where the axial gap is disposed axially between an exducer portion and an inducer portion of the turbine wheel. For example, the axial gap may be disposed axially above an axial position of a tip of a leading edge of a blade of the turbine wheel and axially below an axial position of a tip of a trailing edge of the blade of the turbine wheel.

As shown in FIG. 13B, the shroud component 1352 has an annular shape with an annular ridge 1353, an upper surface 1357-1 (e.g., radially inward from the ridge 1353), an upper surface 1357-2 (e.g., radially outward from the ridge 1353) and a lower surface 1359 that extends between an inner end of the upper surface 1357-1 and an inner end of the lower surface 1359. As shown in FIG. 13B, the shroud component 1352 may be defined by various radii including an innermost radius ($r_1$) (e.g., at or proximate to an upper edge of the surface 1358), an intermediate radius ($r_2$) (e.g., at or proximate to a lower edge of the surface 1358), a spacer opening radius ($r_3$) (e.g., to an axis of a spacer opening of dimension d) and an outermost radius ($r_4$) (e.g., at a surface or an edge within the volute 1370 of the assembly 1300). As shown, the ridge 1353 may be defined by an inner radius and an outer radius as well as an axial height (see, e.g., $\Delta z_3$). For example, FIG. 13B shows a radial dimension ($\Delta r_1$) from an innermost radius ($r_1$) to an upper axial surface of the ridge 1353, a radial dimension ($\Delta r_2$) of the upper axial surface of the ridge 1353 and a radial dimension ($\Delta r_3$) from the upper axial surface of the ridge 1353 to and outer end of the shroud component 1352 (e.g., to $r_4$).

As shown in FIG. 13A, the turbine housing 1362 includes a lower surface 1367 that can form an interface with the ridge 1353 of the shroud component 1352. For example, the ridge 1353 may form a seal interface with the turbine housing 1362 to hinder flow of exhaust from the volute 1370 to the axial gap between the surfaces 1358 and 1368 (e.g., a single seal interface). As an example, a shroud component may include a plurality of ridges where, for example, one or more of the ridges may form a seal interface (e.g., with a turbine housing). As an example, a shroud component may include concentric ridges where at least one of the concentric ridges contacts a surface of a turbine housing to form a seal interface.

As an example, the shroud component 1352 may be part of a cartridge that is supported at least in part by a resilient component (e.g., an elastically deformable component). In such an example, the resilient component (see, e.g., the component 790 of FIG. 7) may apply a biasing force that acts to bias the ridge 1353 of the shroud component 1352 against the turbine housing 1362, for example, to maintain a seal interface.

Figure 14:
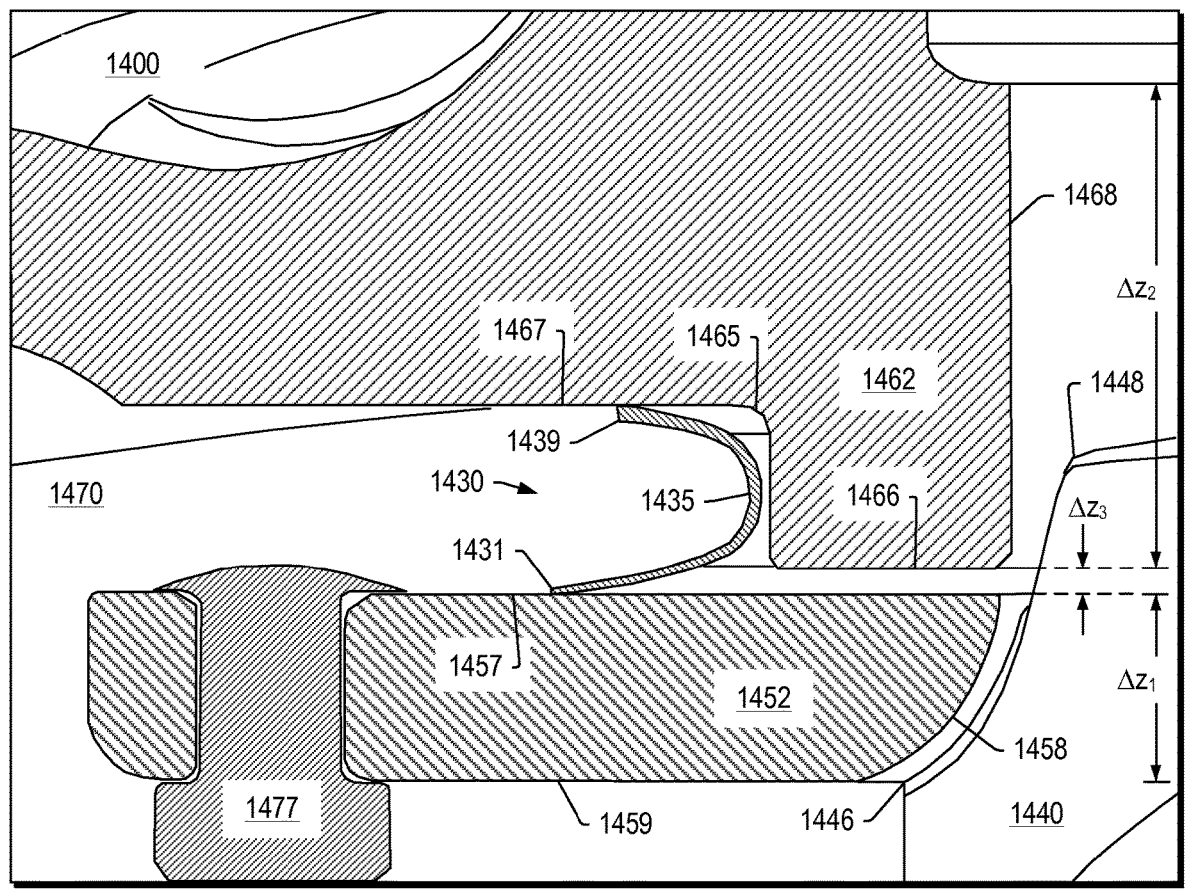
FIG. 14 is a cross-sectional view of an example of a turbocharger assembly that includes an example of a seal.

FIG. 14 shows a cutaway view of a portion of an assembly 1400 that includes a seal 1430, a turbine wheel 1440, a shroud component 1452, a turbine housing 1462 and a volute 1470. As shown in FIG. 14, the shroud component 1452 includes a surface 1458 disposed over an axial distance ($\Delta z_1$) and the turbine housing 1462 includes a surface 1468 disposed over an axial distance ($\Delta z_2$). As shown, an axial gap ($\Delta z_3$) exists between an upper edge of the surface 1458 and a lower edge of the surface 1468, which may optionally include a chamfer, a radius, etc. For example, an annular axial face 1466 may extend radially inwardly to form a shoulder with the surface 1468 and an annular axial face 1457 may extend radially inwardly to form a shoulder with the surface 1458 where the axial gap exists between the two shoulders.

As shown in FIG. 14, the turbine wheel 1440 is disposed in a turbine wheel space defined in part by the shroud component 1452 and the turbine housing 1462 where the axial gap is disposed axially between an exducer portion and an inducer portion of the turbine wheel 1440. For example, the axial gap may be disposed axially above an axial position of a tip 1446 of a leading edge of a blade of the turbine wheel 1440 and axially below an axial position of a tip 1448 of a trailing edge of the blade of the turbine wheel 1440.

As shown in FIG. 14, the shroud component 1452 has an annular shape defined in part by the annular axial face 1457 (e.g., an upper surface) and an annular axial face 1459 (e.g., a lower surface) where the surface 1458 extends between an inner end of the face 1457 and an inner end of the face 1459. In the example of FIG. 14, the shroud component 1452 includes an opening that receives a spacer 1477, for example, to space the shroud component 1452 a distance from another component (e.g., a cartridge component).

As shown in FIG. 14, the turbine housing 1462 includes an annular shoulder 1465 that extends axially downwardly to the annular axial face 1466 and that extends radially outwardly to an annular axial face 1467 (e.g., a lower surface of the turbine housing 1462).

In the example of FIG. 14, the seal 1430 includes a lower edge 1431, a curved portion 1435 and an upper edge 1439. As shown, the lower edge 1431 may be at a radius that exceeds a radius of the upper edge 1439 while the seal 1430 can include a minimum radius along the curved portion 1435 located between the lower edge 1431 and the upper edge 1439. In the example of FIG. 14, the lower edge 1431 of the seal 1430 contacts the annular axial face 1457 of the shroud component 1452 while the upper edge 1439 of the seal 1430 contacts the annular axial face 1467 of the turbine housing 1462. In such an example, the seal 1330 can hinder flow of exhaust from the volute 1470 to the turbine wheel space via the axial gap defined by the annular axial face 1466 and the annular axial face 1457.

As an example, the seal 1430 may be formed of a material such as a metal or an alloy. The material may be elastically deformable such that the seal 1430 acts as a spring that can bias the shroud component 1452 with respect to the turbine housing 1462 with a spring constant sufficient to avoid contact of the annular axial face 1456 and the annular axial face 1466 during normal operation of the assembly 1400 as part of a turbocharger.

As an example, a turbine housing may include a ridge such as, for example, the ridge 1263, and a shroud component may include a ridge such as, for example, the ridge 1353. In such an example, an assembly that includes such a turbine housing and such a shroud component may provide for contact of the ridges, which can define a gap, where contact may hinder flow of exhaust from a volute to a turbine wheel space. As another example, the ridges may be offset such that the ridge of the turbine housing contacts the shroud component at a first radius and such that the ridge of the shroud component contacts the turbine housing at a second, different radius. As an example, a lower surface of a turbine housing may include a plurality of ridges (e.g., concentric ridges). As an example, an upper surface of a shroud component may include a plurality of ridges (e.g., concentric ridges).

Figure 15:
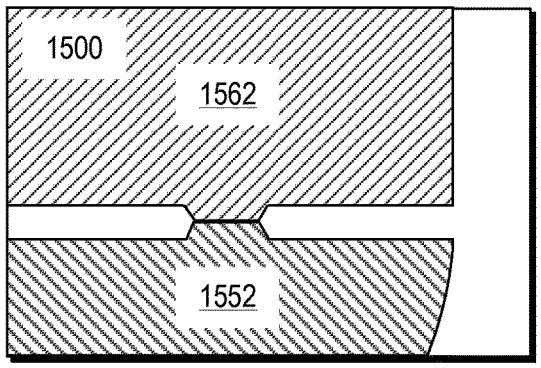
FIG. 15 is a cross-sectional view of an example of a turbocharger assembly.

FIG. 15 shows a cross-sectional view of a portion of an example of an assembly 1500 that includes a shroud component 1552 and a turbine housing 1562 where a ridge of the shroud component 1552 contacts a ridge of the turbine housing 1562 to form a seal interface.

Figure 16:
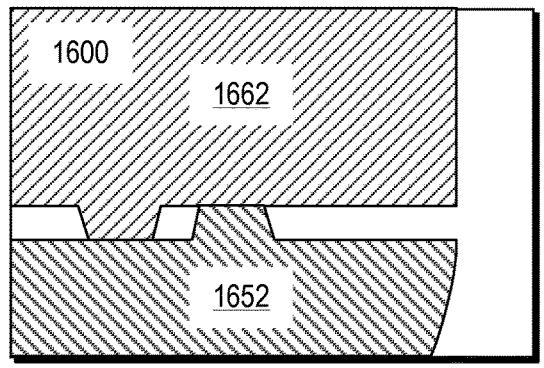
FIG. 16 is a cross-sectional view of an example of a turbocharger assembly.

FIG. 16 shows a cross-sectional view of a portion of an example of an assembly 1600 that includes a shroud component 1652 and a turbine housing 1662 where a ridge of the shroud component 1652 contacts a surface of the turbine housing 1662 to form a seal interface and where a ridge of the turbine housing 1562 contacts a surface of the shroud component 1652 to form a seal interface.

Figure 17:
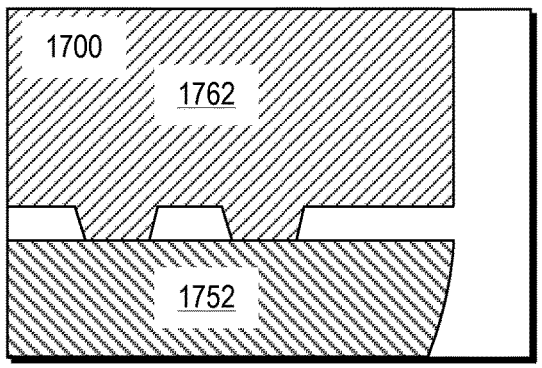
FIG. 17 is a cross-sectional view of an example of a turbocharger assembly.

FIG. 17 shows a cross-sectional view of a portion of an example of an assembly 1700 that includes a shroud component 1752 and a turbine housing 1762 where ridges of the turbine housing 1762 contact a surface of the shroud component 1752 to form seal interfaces.

Figure 18:
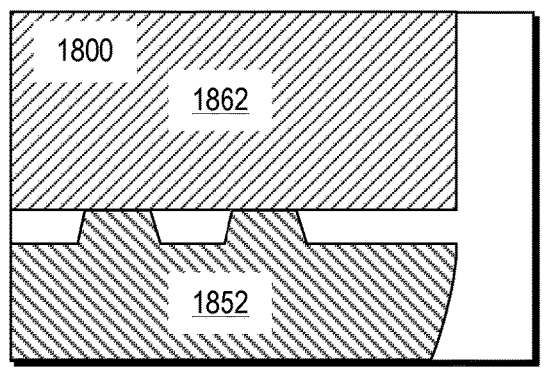
FIG. 18 is a cross-sectional view of an example of a turbocharger assembly.

FIG. 18 shows a cross-sectional view of a portion of an example of an assembly 1800 that includes a shroud component 1852 and a turbine housing 1862 where ridges of the shroud component 1852 contact a surface of the turbine housing 1862 to form seal interfaces.

Figure 19:
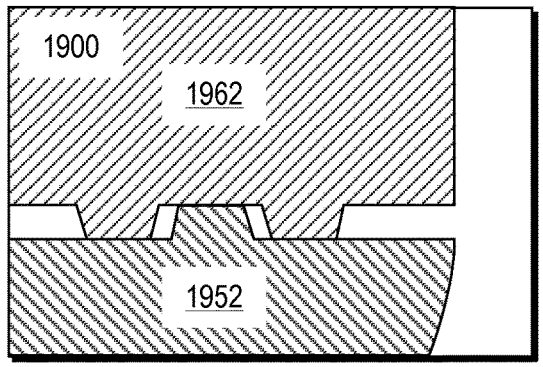
FIG. 19 is a cross-sectional view of an example of a turbocharger assembly.

FIG. 19 shows a cross-sectional view of a portion of an example of an assembly 1900 that includes a shroud component 1952 and a turbine housing 1962 where ridges of the turbine housing 1962 contact a surface of the shroud component 1952 to form seal interfaces and where a ridge of the shroud component 1952 contacts a surface of the turbine housing 1962 to form a seal interface.

Figure 20:
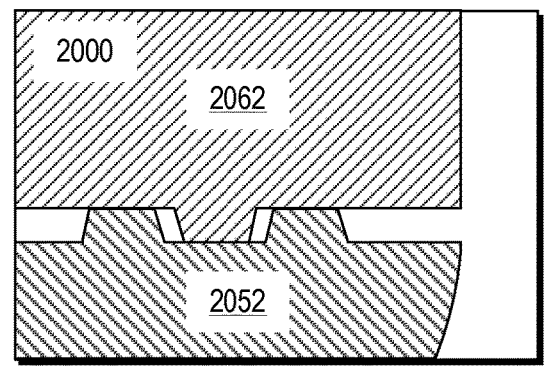
FIG. 20 is a cross-sectional view of an example of a turbocharger assembly.

FIG. 20 shows a cross-sectional view of a portion of an example of an assembly 2000 that includes a shroud component 2052 and a turbine housing 2062 where ridges of the shroud component 2062 contact a surface of the turbine component 2062 to form seal interfaces and where a ridge of the turbine housing 2062 contacts a surface of the shroud component 2052 to form a seal interface.

As mentioned, thermal conditions may cause components to expand and/or contract. For example, a shroud component that includes a substantial pipe portion may respond to temperature in a manner that causes distortion of the shroud component. Such distortion may, for example, alter vane clearance, alter turbine blade clearance, cause undesirable stresses, etc. As shown in various examples, a contoured component can be substantially annular in shape, which may act to minimize thermal distortion. In such an example, thermal distortion may be reduced particularly near a transition axially away from an inducer portion of a turbine wheel, which may be beneficial for low end performance. Such a reduction in distortion (e.g., alteration of contour shape and/or position) may help to maintain expected performance (e.g., efficiency) over a desired range of operational and/or environmental conditions.

As an example, a turbine housing assembly seal can include a cylindrical portion that defines an opening having an axis where the cylindrical portion is disposed at a cylinder radius from the axis; a lower edge disposed at a lower edge radius that exceeds the cylinder radius; an sloped annular portion that extends radially inwardly from the lower edge; a lower bend that extends from the sloped annular portion to a lower axial position of the cylindrical portion; an upper bend that extends from an upper axial position of the cylindrical portion; and an upper edge that extends radially outwardly from the upper bend to an upper edge radius that exceeds the cylinder radius and that is less than the lower edge radius. In such an example, the turbine housing assembly seal can include an uncompressed axial height where, for example, an axial span of the cylindrical portion is greater than 25 percent of the uncompressed axial height.

As an example, a seal may include a sloped annular portion that has a slope angle greater than 10 degrees. As an example, a seal may include a sloped annular portion that has a slope angle less than 30 degrees. As an example, a seal may include a sloped annular portion that includes a slope angle greater than 10 degrees and less than 20 degrees.

As an example, a seal can include a lower bend defined in part by a radius of curvature and an upper bend defined in part by a radius of curvature. In such an example, the radius of curvature of the lower bend may be approximately equal to the radius of curvature of the upper bend.

As an example, a seal can include a cylindrical portion that includes a constant cylinder radius over an axial span (e.g., consider an axial span that may be about 25 percent or more of an axial height of the seal in an uncompressed state). In such an example, in a compressed state, the cylindrical portion may have a relatively a constant cylinder radius over the axial span. For example, a slope angle of an annular portion of the seal may change while the cylindrical portion remains relatively unchanged when transitioning from an uncompressed state to a compressed state or vice versa.

As an example, a seal may be formed of a sheet of material such as, for example, a metal, an alloy, etc. In such an example, the sheet of material may have a sheet thickness. Upon forming the seal, the seal may have a material thickness approximately equal to the sheet thickness. As an example, a seal may include opposing surfaces separated by a material thickness (e.g., thickness measured from one surface to the other surface).

As an example, a seal may include a curved portion disposed between an upper bend and an upper edge. In such an example, the curved portion can include an upper contact surface (e.g., consider an annular contact surface that spans 360 degrees). As an example, a seal can include a curved portion disposed between a sloped annular portion and a lower edge. In such an example, the curved portion can include a lower contact surface (e.g., consider an annular contact surface that spans 360 degrees).

As an example, a method can include shaping a sheet of material to form a turbine housing assembly seal that includes a cylindrical portion that defines an opening having an axis where the cylindrical portion is disposed at a cylinder radius from the axis, a lower edge disposed at a lower edge radius that exceeds the cylinder radius, an sloped annular portion that extends radially inwardly from the lower edge, a lower bend that extends from the sloped annular portion to a lower axial position of the cylindrical portion, an upper bend that extends from an upper axial position of the cylindrical portion, and an upper edge that extends radially outwardly from the upper bend to an upper edge radius that exceeds the cylinder radius and that is less than the lower edge radius. In such an example, the method may include positioning the seal and loading the seal (e.g., applying force to the seal) between a shroud component and a turbine housing to transition the seal from an uncompressed state to a compressed state and to form an upper seal interface and a lower seal interface. In such an example, the method may include, via the seal interfaces, hindering flow of exhaust from an exhaust volute defined at least in part by the turbine housing to a turbine wheel space that includes a lower portion defined by the shroud component and an upper portion defined by the turbine housing where an axial gap exists between the lower portion and the upper portion of the turbine wheel space. In such an example, the cylindrical portion of the seal may at least partially axially overlap with the axial gap.

As an example, an assembly can include a turbine wheel that includes a base, a nose, a rotational axis extending from the base to the nose, an inducer portion and an exducer portion; a turbine housing that at least in part defines an exhaust volute and that includes a lower turbine housing surface that extends from the exhaust volute to a cylindrical surface that defines an upper portion of a turbine wheel space; a shroud component that includes an upper shroud component surface, a lower shroud component surface and a contoured surface disposed between an inner end of the upper shroud component surface and an inner end of the lower shroud component surface wherein the contoured surface defines a lower portion of a turbine wheel space; and a seal mechanism where the turbine housing receives the shroud component and forms an axial gap between a lower axial position of the cylindrical surface and an upper axial position of the contoured surface, where the turbine housing and the shroud component receive at least a portion of the turbine wheel, where the axial gap is axially positioned between an axial position of the inducer portion of the turbine wheel and an axial position of the exducer portion of the turbine wheel and where the seal mechanism hinders flow of exhaust from the exhaust volute to the turbine wheel space via the axial gap (e.g., during operation of the assembly as part of a turbocharger operatively coupled to an internal combustion engine).

As an example, a seal mechanism can include an annular ridge. In such an example, an upper shroud component surface of a shroud component can include the annular ridge where the annular ridge contacts a lower turbine housing surface of the turbine housing to form a seal interface. In such an example, the lower turbine housing surface of the turbine housing may be a planar surface (e.g., a flat surface).

As an example, a seal mechanism can include an annular ridge. In such an example, a lower turbine housing surface of a turbine housing can include the annular ridge where the annular ridge contacts an upper shroud component surface of a shroud component to form a seal interface. In such an example, the upper shroud component surface of the shroud component may be a planar surface (e.g., a flat surface) and, for example, a lower shroud component surface of the shroud component may be a planar surface (e.g., a flat surface), which may define, at least in part, a nozzle or nozzles, a throat or throat, etc. for flow of exhaust from a volute to an inducer portion of a turbine wheel.

As an example, a seal mechanism may include a first annular ridge of an upper shroud component surface of a shroud component and a second annular ridge of a lower turbine housing surface of a turbine housing where the first annular ridge and the second annular ridge contact to form a seal interface.

As an example, a seal mechanism may include a seal (e.g., as a component) that contacts a lower turbine housing surface of a turbine housing and an upper shroud component surface of a shroud component to form seal interfaces (e.g., an upper seal interface and a lower seal interface with respect to the seal). In such an example, the lower turbine housing surface of the turbine housing may include an annular step having an axial step height and the seal may include an axial height defined by the axial gap and the axial step height.

As an example, a turbine assembly for a turbocharger can include a turbine housing that includes a lower turbine housing surface that extends to a cylindrical surface that defines an upper portion of a turbine wheel space having an axis; a shroud component that includes a lower shroud component surface, an upper shroud component surface, and a contoured surface that extends between the lower shroud component surface and the upper shroud component surface and that defines a lower portion of the turbine wheel space, where the turbine housing receives the shroud component and forms an axial gap between a lower axial position of the cylindrical surface and an upper axial position of the contoured surface; and a seal that includes a lower edge, a sloped annular portion that extends from the lower edge, a lower bend that extends from the sloped annular portion, a cylindrical portion that extends from the lower bend, and an upper bend that extends from the cylindrical portion to an upper edge, where the seal contacts the lower turbine housing surface of the turbine housing and contacts the upper shroud component surface of the shroud component to axially overlap at least a portion of the cylindrical portion of the seal and the axial gap. In such an example, the lower edge of the seal may include a radius (e.g., defined as a distance from an axis of a turbine wheel space) and the upper shroud component surface may include a ridge disposed at a radius that exceeds the radius of the lower edge of the seal. In such an example, the upper shroud component surface may include a well that extends radially inwardly from the ridge where the lower edge of the seal may be disposed within the well.

As an example, a turbine assembly can include a shroud component that includes an upper shroud component surface that includes an annular axial face and a turbine housing that includes a lower turbine housing surface that includes an annular axial face where an axial gap exists between the annular axial faces. As an example, a turbine housing may include a pipe portion with an axial face and a shroud component may include a pipe portion with an axial face where the pipe portions, upon assembly to form an turbine assembly, define an axial gap. In such an example, the axial gap may be axially disposed between an inducer portion and an exducer portion of a turbine wheel of the turbine assembly. For example, consider a rotational axis of a turbine wheel where an inducer portion includes an axially uppermost, outer blade tip at a first axial position and where an exducer portion include an uppermost, outer blade tip at a second axial position. In such an example, the axial position of the axial gap may be between a third axial position and a fourth axial position where, in an axial order from lowest (e.g., base of turbine wheel) to highest (nose of turbine wheel), are the first axial position, the third axial position, the fourth axial position and the second axial position.

As an example, an upper shroud component surface of a shroud component can include an annular ridge, an annular well, an annular shoulder and an annular axial face. As an example, a lower turbine housing surface of a turbine housing can include an annular ridge, an annular well, an annular shoulder and an annular axial face.

As an example, an upper shroud component surface of a shroud component can include a shroud component annular ridge, a shroud component annular well, a shroud component annular shoulder and a shroud component annular axial face and a lower turbine housing surface of a turbine housing can include a turbine housing annular ridge, a turbine housing annular well, a turbine housing annular shoulder and a turbine housing annular axial face.

As an example, a turbine assembly can include an axial clearance (e.g., an axial gap) that exists between an upper shroud component surface of a shroud component and a lower turbine housing surface of a turbine housing. In such an example, where the turbine housing defines in part a volute, in absence of a seal (e.g., where a seal as a component forms seal interfaces with the turbine housing and the shroud component), a line-of-sight may exist between the volute and the axial gap.

As an example, a turbine assembly can include a turbine wheel that includes an inducer portion and an exducer portion where an axial gap formed between a turbine housing and a shroud component is axially disposed between the inducer portion and the exducer portion of the turbine wheel.

Although some examples of methods, devices, systems, arrangements, etc., have been illustrated in the accompanying Drawings and described in the foregoing Detailed Description, it will be understood that the example embodiments disclosed are not limiting, but are capable of numerous rearrangements, modifications and substitutions.

What is claimed is:

1. A turbine housing assembly comprising:
    a shroud component that defines a rotational axis of a turbine wheel, wherein the shroud component comprises an annular wall that comprises a contoured turbine wheel side surface and an opposing shroud component volute side surface at a shroud component volute side surface radius;
    a turbine housing that comprises an annular wall that comprises a turbine wheel side surface and an opposing turbine housing volute side surface at a turbine housing volute side surface radius; and
    a turbine housing assembly seal that is disposed between and axially compressively pre-loaded by the turbine housing and the shroud component, wherein the turbine housing assembly seal comprises:
        a cylindrical portion that defines an opening having an axis wherein the cylindrical portion is disposed at a cylinder radius from the axis that is greater than the shroud component volute side surface radius and that is greater than the turbine housing volute side surface radius and wherein the cylindrical portion faces the shroud component volute side surface and the turbine housing volute side surface;
        a lower edge disposed at a lower edge radius that exceeds the cylinder radius;
        a sloped annular portion that extends radially inwardly from the lower edge, wherein the sloped annular portion comprises a slope angle greater than 10 degrees;
        a lower bend that extends from the sloped annular portion to a lower axial position of the cylindrical portion;
        an upper bend that extends from an upper axial position of the cylindrical portion; and
        an upper edge that extends radially outwardly from the upper bend to an upper edge radius that exceeds the cylinder radius and that is less than the lower edge radius.

2. The turbine housing assembly seal of claim 1 comprising an uncompressed axial height wherein an axial span of the cylindrical portion is greater than 25 percent of the uncompressed axial height.

3. The turbine housing assembly seal of claim 1 wherein the sloped annular portion comprises a slope angle less than 30 degrees.

4. The turbine housing assembly seal of claim 1 wherein the sloped annular portion comprises a slope angle less than 20 degrees.

5. The turbine housing assembly seal of claim 1 wherein the lower bend comprises a radius of curvature and wherein the upper bend comprises a radius of curvature.

6. The turbine housing assembly seal of claim 5 wherein the radius of curvature of the lower bend is approximately equal to the radius of curvature of the upper bend.

7. The turbine housing assembly seal of claim 1 wherein the cylindrical portion comprises a constant cylinder radius over an axial span.

8. The turbine housing assembly seal of claim 7 wherein, in a compressed state, the cylindrical portion comprises a constant cylinder radius over the axial span.

9. The turbine housing assembly seal of claim 1 wherein the seal comprises opposing surfaces separated by a material thickness.

10. The turbine housing assembly seal of claim 1 comprising metal.

11. The turbine housing assembly seal of claim 1 comprising an alloy.

12. The turbine housing assembly seal of claim 1 wherein the seal comprises a curved portion disposed between the upper bend and the upper edge.

13. The turbine housing assembly seal of claim 12 wherein the curved portion comprises an upper contact surface.

14. The turbine housing assembly seal of claim 1 wherein the seal comprises a curved portion disposed between the sloped annular portion and the lower edge.

15. The turbine housing assembly seal of claim 12 wherein the curved portion comprises a lower contact surface.

16. A turbine housing assembly seal comprising:
- a cylindrical portion that defines an opening having an axis (z) wherein the cylindrical portion is disposed at a cylinder radius ($r_i$) from the axis (z) and comprises an axial span ($\Delta z_3$);
- a lower edge disposed at a lower edge radius ($r_L$) that exceeds the cylinder radius ($r_i$);
- an sloped annular portion that extends radially inwardly from the lower edge at a free-standing slope angle ($\alpha$) greater than 10 degrees and less than 30 degrees that has an axial span ($\Delta z_1$);
- a lower bend that extends from the sloped annular portion to a lower axial position of the cylindrical portion and that comprises an axial span ($\Delta z_2$);
- an upper bend that extends from an upper axial position of the cylindrical portion; and
- an upper edge that extends radially outwardly from the upper bend to define an axial span ($\Delta z_4$) wherein the upper edge has an upper edge radius ($r_u$) that exceeds the cylinder radius ($r_i$) and that is less than the lower edge radius ($r_L$), wherein a difference between the lower edge radius ($r_L$) and the cylinder radius ($r_i$) exceeds an axial height ($\Delta z_T$) defined by the sum of the axial spans ($\Delta z_1$, $\Delta z_2$, $\Delta z_3$, $\Delta z_4$) to impart a substantially linear spring with a constant (k) that, responsive to axial compressive loading in an assembled state of the turbine housing assembly seal in a turbocharger assembly that pre-loads the turbine housing assembly seal, maintains the cylindrical portion at a substantially axial orientation while the slope angle ($\alpha$) decreases.

* * * * *